United States Patent
Chang

(10) Patent No.: US 9,898,564 B2
(45) Date of Patent: Feb. 20, 2018

(54) SSTA WITH NON-GAUSSIAN VARIATION TO SECOND ORDER FOR MULTI-PHASE SEQUENTIAL CIRCUIT WITH INTERCONNECT EFFECT

(71) Applicant: Mau-chung Chang, Hillsborough, CA (US)

(72) Inventor: Mau-chung Chang, Hillsborough, CA (US)

(73) Assignee: Sage Software, Inc., Hillsborough, CA (US)

( * ) Notice: Subject to any disclaimer, the term of this patent is extended or adjusted under 35 U.S.C. 154(b) by 125 days.

(21) Appl. No.: 14/591,852

(22) Filed: Jan. 7, 2015

(65) Prior Publication Data

US 2015/0199462 A1 Jul. 16, 2015

Related U.S. Application Data

(60) Provisional application No. 61/927,740, filed on Jan. 15, 2014.

(51) Int. Cl.
*G06F 17/50* (2006.01)

(52) U.S. Cl.
CPC ...... *G06F 17/5031* (2013.01); *G06F 17/5022* (2013.01); *G06F 17/5045* (2013.01)

(58) Field of Classification Search
CPC .................................................. G06F 17/5022
See application file for complete search history.

(56) References Cited

U.S. PATENT DOCUMENTS

| 5,680,332 A * | 10/1997 | Raimi ............ G01R 31/31835 703/13 |
| 7,086,023 B2 | 8/2006 | Visweswariah |
| 7,890,915 B2 | 2/2011 | Celik |
| | | (Continued) |

OTHER PUBLICATIONS

Agarwal et al., Circuit optimization using statistical static timing analysis, Conference Paper, DOI: 10.1109/DAC.2005.193825 Source: IEEE Xplore, Jul. 2005.*

(Continued)

*Primary Examiner* — Charlie Y Peng

(57) ABSTRACT

In the present invention the issue of SSTA in multi-phase sequential circuit with cross-talk in consideration of non-uniform timing constraint and process variations up to the 2nd order is proposed. Use forward breadth first search to calculate the accumulated probabilities at each node for clock phases and edge probability with respect to input and output clock phases, followed by backward depth first traversal to find all critical paths with their probabilities greater than user specified threshold. A method is proposed to pre-characterize the timing library including second order variations. For cross-talk, the poles and residues of admittance matrix and voltage transfer are carried out to $2^{nd}$ order variations. Effective capacitances and waveforms at interconnect input or driver's immediate output are calculated to $2^{nd}$ order variations. Delays at victim outputs are then calculated to $2^{nd}$ order variations and fed back to SSTA, the probability of path occurrence can be calculated accurately.

13 Claims, 16 Drawing Sheets

(56) References Cited

U.S. PATENT DOCUMENTS

| | | | |
|---|---|---|---|
| 7,900,175 B2 | 3/2011 | Chang | |
| 8,244,491 B1 | 8/2012 | Zhang | |
| 2004/0044510 A1* | 3/2004 | Zolotov | G06F 17/5036 703/14 |
| 2007/0277134 A1* | 11/2007 | Zhang | G06F 17/5031 716/113 |

OTHER PUBLICATIONS

Chang et al., Statistical timing analysis under spatial correlations, IEEE Transactions on Computer-Aided Design of Integrated Circuits and Systems (vol. 24, Issue: 9, Sep. 2005).*

Lizheng Zhang, Jun Shao, Charlie Chungping Chen Non-Gaussian Statistical Parameter Modeling for SSTA with Confidence Interval Analysis ISPD 2006, Apr. 9-12, 2006, pp. 33-38.

Jessica Qian, Satyamurthy Pullela, and Lawrence Pillage, Modeling the "Effective Capacitance" for the RC Interconnect of CMOS Gates, IEEE Transactions on Computer-Aided Design of Integrated Circuits and Systems, vol. 13, No. 12,pp. 1526-1535 Dec. 1994.

Kevin J. Kerns and Andrew T. Yang, Stable and Efficient Reduction of Large, Multiport RC Networks by Pole Analysis via Congruence Transformations, Proc. DAC 1996, pp. 280-285.

Kevin J. Kerns and Andrew T. Yang, Preservation of Passivity During RLC Network Reduction via Split Congruence Transformations, Stable and Efficient Reduction of Large, Multiport RC Networks by Pole Analysis via Congruence Transformations, Proc. DAC 1997, pp. 34-39.

Altan Odabasiouglu, Mustafa Celik, PRIMA: Pssive Reduced-Order Interconnect Macromodeling Algorithm, IEEE Transactions on Computer-Aided Design of Integrated Circuits and Systems, vol. 17, No. 8,pp. 645-654 Aug. 1998.

Ying Liu, Lawrence T. pillegi and Andrzej J. Strojwas, Model Order-Reduction of RC(L) Interconnect including Variational Analysis, Proc. DAC 1999, pp. 201-206.

Sani R. Nassif, Modeling and Analysis of Manufacturing Variations, Proc. CICC 2001, pp. 223-228.

C. Visweswariah, K. Ravindran, k. kalafala, S.G. Walker, S. Narayan First-Order Incremental Block-Based Statistical Timing Analysis, Proc. DAC 2004, pp. 331-336.

Yaping Zhan, Andrzej J. Strojwas, Xin Li, Lawrence T. Pileggi, Correlation-Aware Statistical Timing Analysis with Non-Gaussian Delay Distribution, Proc. DAC 2005, pp. 77-82.

Soroush Abbaspour, Hanif Fatemi, Massoud Pedram, Parameterized Block-Based Non-Gaussian Statistical Gate Timing Analysis, IEEE Transactions on Computer-Aided Design of Integrated Circuits and Systems, vol. 26, No. 8,pp. 1495-1508 Aug. 2007.

Anirudh Devgan, Chandramouli Kashyap, Block-based Static Timing Analysis With Uncertainty, Proc. ICCAD 2003, pp. 607-614.

* cited by examiner

Output waveform $f(t,\alpha)$  $\alpha$ is random parameter $f(t,\alpha) = f_0(t) + f_1(t)\alpha + f_2(t)\alpha^2$

1601

$t = t_n + \Delta t = t_n + x\alpha + y\alpha^2$ $f(t,\alpha) = 0.5\, Vdd$

1602

$f(t,\alpha) = f_0(t_n) + f_0'(t_n)(x\alpha + y\alpha^2) + f_0''(t_n)\frac{1}{2}x^2\alpha^2 + f_1(t_n)\alpha$
$+ f_1'(t_n)(x\alpha^2) + f_2(t_n)\alpha^2$
$= f_0(t_n) + \alpha(f_0'(t_n)x + f_1(t_n)) + \alpha^2(f_2(t_n) + f_0'(t_n)y + f_0''(t_n)\frac{1}{2}x^2 + f_1'(t_n)x + f_2(t_n))$

1603 obtain $t_n$, x and y $f_0(t_n) = 0.5 Vdd$ $x = -\dfrac{f_1(t_n)}{f_0'(t_n)}$ $y = -\dfrac{f_2(t_n) + f_0''(t_n)\frac{x^2}{2} + f_1'(t_n)x + f_2(t_n)}{f_0'(t_n)}$

SSTA WITH NON-GAUSSIAN VARIATION TO SECOND ORDER FOR MULTI-PHASE SEQUENTIAL CIRCUIT WITH INTERCONNECT EFFECT

FIELD OF THE INVENTION

The present invention relates to integrated circuit design, and more particularly to a design timing verification tool that is capable of handling the non-Gaussian variation effects to the second order for both gate and interconnect on Statistical Static Timing Analysis (SSTA) for multi-phase sequential circuit.

BACKGROUND OF THE INVENTION

It has been quite well-known that due to the complexity of integrated circuits, it is not possible to apply a finite set of test vectors to verify the circuit delays for all the critical paths in the chip. Therefore, the vector-less approach or Static Timing Analysis (STA) is used widely to verify the timing of chip for each corner case with fixed gate delays. However, in today's nanometer process technology the manufacturing process variation plays a significant role in circuit delays, making SSTA increasingly important. Furthermore, interconnect part can be as dominant as the gate part in today's technology. Therefore, the issue of including process variation effect in the study of interconnect becomes extremely important.

SSTA is formalized in a way very similar to that of STA in terms of path tracing algorithm, but with quite a few differences. In STA, the gate delay is a fixed number, while in SSTA the delay is expressed as a random variable with some probability distribution function (PDF). In STA the critical paths are presented to the users based on slack which is the delay exceeding the timing limit. However, SSTA uses slack which means the probability of the occurrence of the critical path exceeding the use-specified threshold in terms of probability. In the presence of multi-phase sequential elements the timing constraints become complicated in the sense that the timing constraint is not uniform for all the paths, thus complicating the path tracing algorithms based on the breadth first search approach. Some specific algorithm in STA has been described in detail by Chang before. For example in STA the latest arrival time with respect to clock phases are stored at each node, while in SSTA the node stored accumulated probability. The path tracing procedure in terms of probability used in this invention is different from algorithm used by Visweswariah.

The process of calculating the aforementioned accumulated probability in SSTA at each node can be much more involved than that of storing the latest arrival time in STA. In SSTA, first we need to store the latest arrival time by using the max operation for all arrival times from each input of the gate with all the arrival times being expressed by random variables. Even we start with Gaussian distribution after max operation the result becomes non-Gaussian. Therefore, we need to handle max operation for Non-Gaussian distribution. If a random variable, is the linear combination of several Gaussian variables, then this random variable is Gaussian. To include non-Gaussian behavior, this random variable needs to be expressed as a sum of each Gaussian random variables to the second order. Zhan has proposed an algorithm to handle max operation with non-Gaussian distributions. The concept of edge probability can be understood as follows. For gate C with two inputs A and B, we use the notation that A is the random variable of the latest arrival time at the output of gate C for signal propagating from A to the output of gate C, and random variable B is defined similarly. For gate C with two inputs A and B the edge probability from A to output of C is Prob(A>B) meaning the probability of the latest signal at gate output coming from A by taking the integral of the PDF of Prob(A>B). Prob(B>A) then follows from 1-Prob(A>B). The accumulated probability at the given node then is evaluated by taking the largest of the products of edge probability for each gate along the path reaching this said node. We have adopted the algorithm of carrying out breadth first search to achieve these aforementioned accumulated probability for each node and then using depth first traversal to trace backward recursively to generate the critical paths with probability of occurrence greater than a specified probability threshold.

In SSTA with non-Gaussian delay distribution, the procedure of pre-characterizing the timing library to quadratic order of the Gaussian random variables is quite different from that of STA. The timing library in STA stores the gate delay as a function of gate input slope and gate output loading. In SSTA, this timing library stores the coefficients which are random variables in terms of sum of several Gaussian random variables up to quadratic order, while in STA the said coefficients are merely numbers. In evaluating the non-Gaussian delay distribution function use slope and output load as random variables up to quadratic order for the Gaussian random variables, and the coefficients from the equation also to the second order.

The process of calculating the aforementioned accumulated probability in SSTA at each node can be further complicated in the presence of interconnect. In STA the effective capacitance is already quite well-known. In this approach the gate driving the interconnect part is decomposed into two stages, the first stage is the driving gate with the effective capacitance and the output of the immediate output of the driving gate serves as the driving point of the second stage, namely the interconnect. Therefore, driving point admittance matrix and voltage transfer from the driving point to interconnect outputs are needed to calculate the delay from the input of the gate to both the immediate output of the gate and the interconnect outputs. A mathematical algorithm is presented to calculate admittance matrix and voltage transfer to the second order in powers of those Gaussian random variables due to manufacturing process variation. Subsequently, all the poles and residues for both admittance matrix and voltage transfer are also expressed to the second order in powers of Gaussian random variables. Thus, voltage wave function also expressed as random variable is obtained and delay distribution can be obtained.

In the case of cross-talk, effective capacitance approach by using the admittance matrix with poles and residues with variations up to the second order is also adopted. The effective capacitance of each gate by taking into account of the shift time of aggressor's input with respect to the victim's input are calculated and using admittance matrix with poles and residues with variations up to the second order. As to the victim delays from the immediate output of the input driver to the victim outputs, they are calculated by making use voltage transfer up to the $2^{nd}$ order variation effect. Again, in SSTA, all of these delay quantities are treated as non-Gaussian random variables.

Finally, with all delay information in place, path search is continued until all critical paths in terms of probability are identified.

SUMMARY OF THE INVENTION

This invention provides a tool and a method for performing SSTA of a circuit with multi-phase sequential elements with interconnect, consisting of using path analysis including both forward bread first search and backward depth first traversal considering constraint with multi-phase sequential elements to generate critical paths in term of probability of path occurrence, considering gate and interconnect delays with non-Gaussian variation up to quadratic order in the path analysis, handling cross-talk issue with non-Gaussian variation up to quadratic order in the path analysis, and characterizing cells with non-Gaussian variation up to quadratic order.

According to another aspect, a SSTA tool according to the invention provides a method of forward breadth first search considering constraint with multi-phase sequential elements to first store clock phases of the driven gates to determine whether two signals coming from different phases of inputs of the gate should merge at the output node, and calculate the accumulated probability at each node as a vector with respect to clock phases, and edge probability matrix associated with each clock phase of input of the gate and the clock phase of output of the gate.

According to another aspect, a SSTA tool according to the invention provides a method of backward depth first traversal considering timing constraint with multi-phase sequential elements to search paths backward from the flip-flop data input with negative slack in terms of probability and make use of accumulated probabilities at node and input of the fanin gate of the said node and the edge probability from the said input to said output with certain clock phases to determine the probability of the path passing through the said input associated with clock phase and keep searching recursively.

According to another aspect, a SSTA tool according to the invention provides a method to pre-characterize the timing library of the gate delay and its output slope as random variables in terms of input slope and output loading also as random variables with the coefficients in terms of process variations to the $2^{nd}$ order.

According to another aspect, a SSTA tool according to the invention provides a method of considering gate and interconnect delays with non-Gaussian variation up to quadratic orders by evaluating the input admittance matrix and voltage transfer from interconnect input to its out outputs all of which are random variables to the $2^{nd}$ order of variation effects and computing gate effective capacitance and interconnect delay also in terms of $2^{nd}$ order variation effect.

According to another aspect, a SSTA tool according to the invention provides a method of computing gate effective capacitance up to quadratic order of variation effect using the input admittance matrix of the interconnect driven by the gate up to quadratic order of variation effect by adopting iterative procedure including evaluating waveform parameters with $2^{nd}$ order variation effect and re-evaluating capacitance utilizing driving input admittance in terms of poles and residues with $2^{nd}$ order variation effects.

According to another aspect, a SSTA tool according to the invention further provides a method of evaluating the driving input admittance matrix of the interconnect by formulating these up to quadratic order of variation effect and using Arnoldi's method including variations to achieve orthonormal bases and fitting each matrix element to simple pole format with pole and residue being expressed in terms of variations up to the $2^{nd}$ order.

According to another aspect, a SSTA tool according to the invention further provides a method of adopting iterative procedure in computing effective capacitance by approximating waveform with combination of linear and exponential waveforms and achieving admittance matrix and effective capacitance exactly.

According to another aspect, a SSTA tool according to the invention further provides a method of handling cross-talk issue with non-Gaussian variation up to quadratic order by iteratively calculating effective capacitance for each port and obtaining waveform at each port in terms of parameters up to $2^{nd}$ order of variation.

According to another aspect, a SSTA tool according to the invention further provides a method of calculating voltage transfer using Arnoldi's method up to $2^{nd}$ order of variation and fitting matrix element into simple pole format with pole and residue as random variables including up to $2^{nd}$ order of variation.

According to another aspect, a SSTA tool according to the invention further provides a method of calculating voltage wave at interconnect outputs by approximating the waveform at interconnect inputs with combination of linear and exponential waveforms and achieving voltage transfer pole and residues to the $2^{nd}$ order of variation.

According to another aspect, a SSTA tool according to the invention further provides a method of finding the time at which the waveform expressed as a random variable up to $2^{nd}$ order of variation reaches certain value.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIG. 16 shows an example finding time t up to the second order of random parameter for waveform reaching certain value.

DETAILED DESCRIPTION OF THE
PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

As set forth above, the issue of SSTA incorporating the interconnect effect has been addressed before. However, to increase accuracy of path analysis results, the physical quantities such as delay and slope of waveform in SSTA must be expressed as non-Gaussian PDF. Furthermore, to handle gate and interconnect delays correctly, these two parts must be treated together by using the well-known effective capacitance approach. Therefore, the cells and interconnect must be pre-characterized to quadratic order of the process variation effects. Besides, this problem becomes even more complicated if the circuit has multi-phase sequential elements. It is necessary to have a timing analysis engine using forward signal propagation based on breadth first search followed by backward propagation using depth first traversal to generate critical paths in terms of probability. In stark contrast, as shown in FIG. 1, according to an aspect of the invention, a method implemented into SSAT tool to resolve these issues is discussed.

Figure 1:
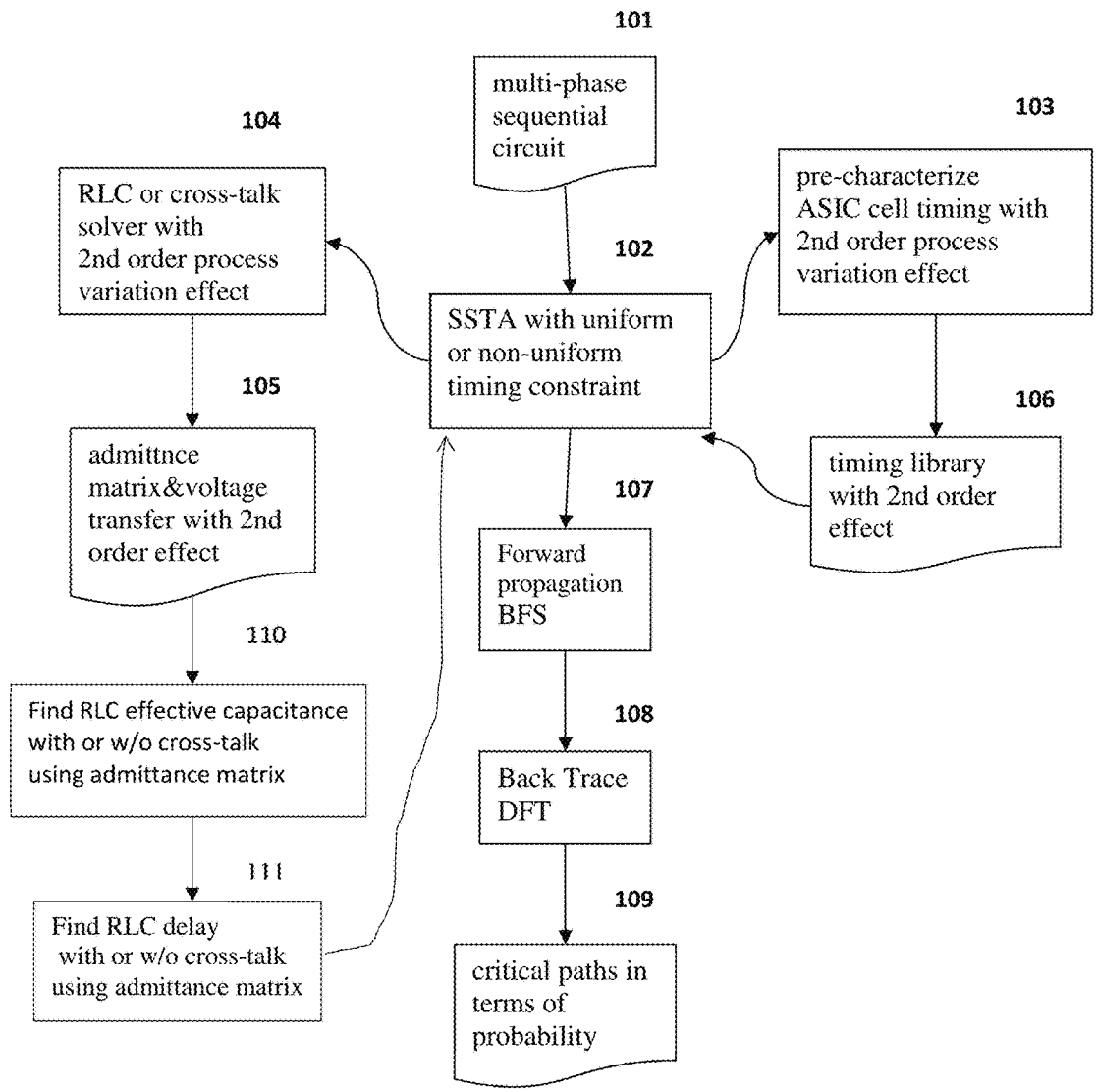
FIG. 1 is a block diagram illustrating path based SSTA with cross-talk analysis according to the present invention.

In FIG. 1 a circuit description 101, which can be complicated in the presence of multi-phase sequential elements, is accepted by the tool SSTA 102 handling non-uniform timing constraints since paths between source and destination flip-flops can have different timing constraints. The circuit description 101 can be at gate level, or combination of gate and transistor level, due to the fact the tool targets at hybrid design. Since the transistor level description can be partitioned into gates, the timing analysis will be handled similarly at gate level. Our discussion for SSTA is limited to gate level, and there is no need to specifically distinguish gate and transistor level.

As shown in FIG. 1 the SSTA tool 102 is used to pre-characterize timing of the cells in terms of a second-order delay model instead of first-order approximation 103 and results go to a file 106 used for future runs. The tool 102 is also used 104 to interconnect solver generating information needed to gate level delay calculation also up to second order of process variation effect and store the results in a file 105. SSTA 102 carries out timing check for all paths with non-uniform timing constraints in two steps, namely forward propagation based on BFS 107 and backward traversal using DFT 108. However, the detailed algorithms are different from those published algorithms by Visweswariah. The final result reports the critical path in terms of the probability of the path 109.

According to one aspect of the invention, new timing analysis algorithm 107 108 in this tool of SSTA with uniform or non-uniform timing constraint 102 is discussed here in detail. First, some basic notation is reviewed. In SSTA, the delay or slope at the node is not a number, but expressed as a random variable with certain PDF due to process variation. If the random variable A has Gaussian distribution, then $$A=a+bx$$

in which x is a random variable with normalized Gaussian distribution N(0,1). The PDF $f_x$ for random variable x is $$f_x(x)=1/\sqrt{2\pi}\exp(-x^2)$$

while the PDF $f_A(x)$ for random variable A is $$f_x(x)=1/\sqrt{2\pi}\exp(-((x-a)/b)^2)$$

with a and b being the nominal value and variance for A, respectively.

In reality any random variable representing physical quantities like delay, slope etc. cannot be approximated by Gaussian distribution exactly, and must be modeled by non-Gaussian distribution including the second-order effect such as $$A=a+bx+cx^2$$

Note that x can be a vector with each component representing independent process parameter. For example, transistor width and length are two independent process parameters. In SSTA the operation MAX(X,Y) is used to store PDF of max of the two random variables X and Y. Suppose a gate has two inputs i1 and i2 and one gate output out with their latest arrival times at two inputs i1 and i2 stored as two random variables A and B, respectively. Two delays $delay_{i1 \to out}$ out and $delay_{i2 \to out}$ out are represented by C and D also as random variables. The latest arrival times in terms of random variables at out from the two inputs i1 and i2 are E and F, respectively. We have $$A=a_0+a_1x+a_2x^2$$

$$B=b_0+b_1x+b_2x^2$$

$$C=c_0+c_1x+c_2x^2$$

$$D=d_0+d_1x+d_2x^2$$

$$E=(a_0+c_0)+(a_1+c_1)x+(a_2+c_2)x^2$$

$$F=(b_0+d_0)+(b_1+d_1)x+(b_2+d_2)x^2$$

$$MAX(E,F)=e_0+e_1x+e_2x^2$$

Then, MAX(E,F) is computed to get $e_0$, $e_1$ and $e_2$ and it is the latest arrival time in terms of a random variable stored at the output of the gate. The computation of $e_0$, $e_1$ and $e_2$ by Zhan et al. is already quite well-known, and there is no need to repeat them here. In SSTA the probability of the path is needed besides the latest arrival time which is random variable. Still using the above example of a gate with two inputs, we need to know the probability for each of the two paths, namely from i1 to out and i2 to out. This information is obtained from the calculation of MAX(E>F) and MAX (F>E) with MAX(E,F)=MAX(E>F)+MAX(F>E). The probability for E>F is obtained by integrating the PDF (Probability Density Function) of MAX(E>F) and same for F>E.

Figure 2:
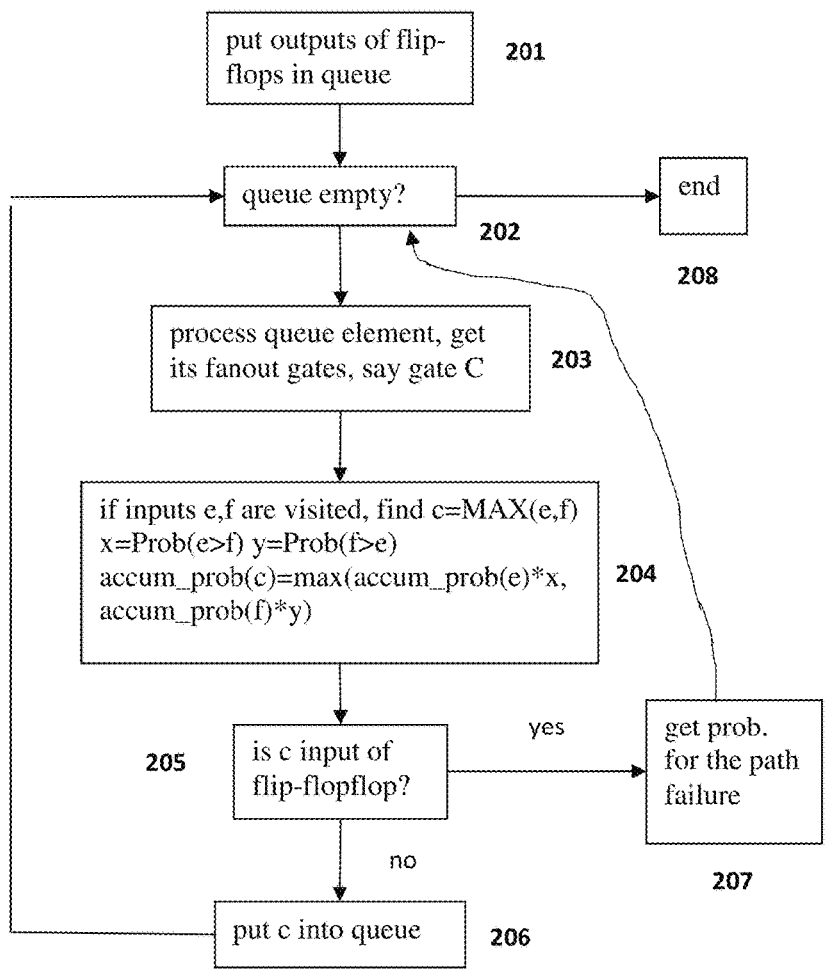
FIG. 2 shows the flowchart of forward propagation based on breadth first traversal in SSTA according to the present invention.

According to one aspect of the invention, FIG. 2 shows the flowchart of forward propagation based on BFS 107. First start with signals coming from the outputs of the flip-flops. As standard in BFS, those signals are put into queue 201, start processing the elements in queue 203 to see if the inputs of the fanouts gates have been visited. If so, MAX operation for these inputs is carried out 204. In stark contrast to Viseweswariah, the accumulated probability (accum_prob) of the node, which is the most critical probability for all paths ending at the said node, is being found in the following way. Compute x and y for probabilities from inputs, say e and f, to output c for gate C, then accum_prob (c), max(accum_prob(e)*x, accum_prob(f)*y) 204. In case the said output c of the said gate C is the input of edge_t-riggered flip-flop 205, the probability of failure of the most critical path needs to be computed. That is obtained by integrating the PDF of the latest arrival time, say D, with respect to the whole parameter space with the constraint that D greater than the timing constraint 207. No paths will be searched beyond the destination of edge-triggered flip-flop. As to level sensitive latch, timing constraint become complicated, but the main algorithm of SSTA will not be changed. Therefore, the discussion on level sensitive latch is omitted here. If the said node c is not input of flip-flop 206, then put it to queue and keep repeating the steps as discussed above until the queue becomes empty 208.

Figure 3:
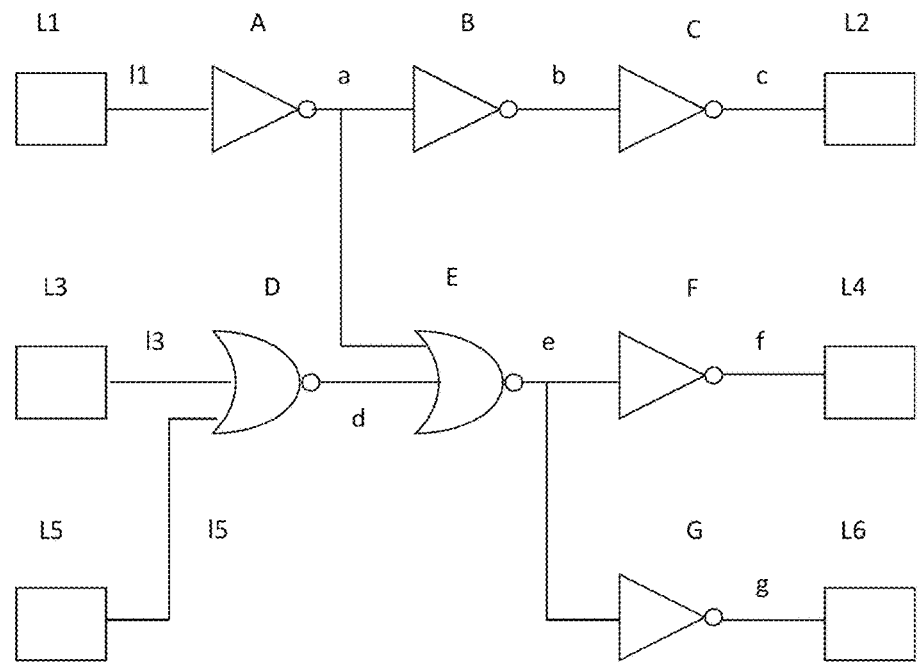
FIG. 3 is an example circuit for illustrating the concept of forward propagation based on breadth first traversal and backward search based on depth first traversal in SSTA.
Figure 4:
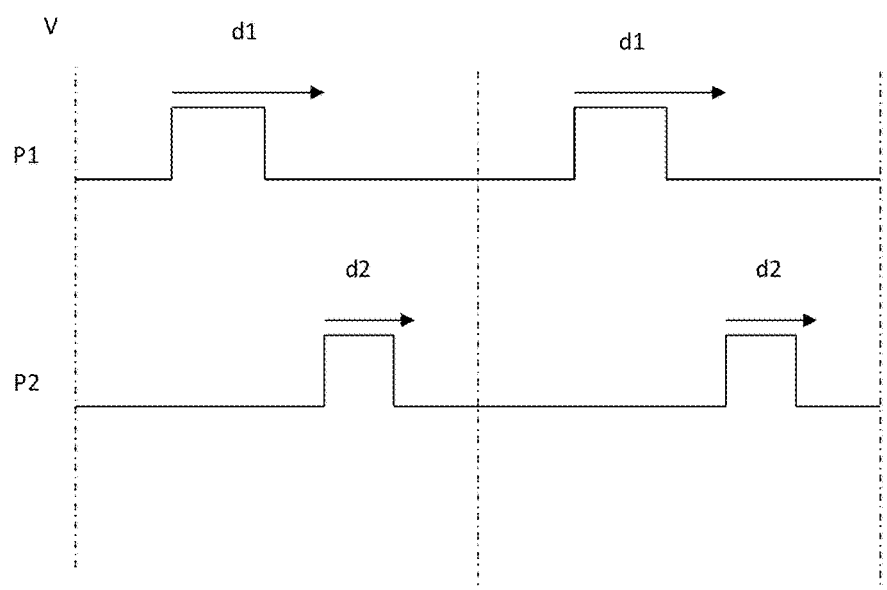
FIG. 4 illustrates an example timing diagram for several clock phases.
Figure 5:
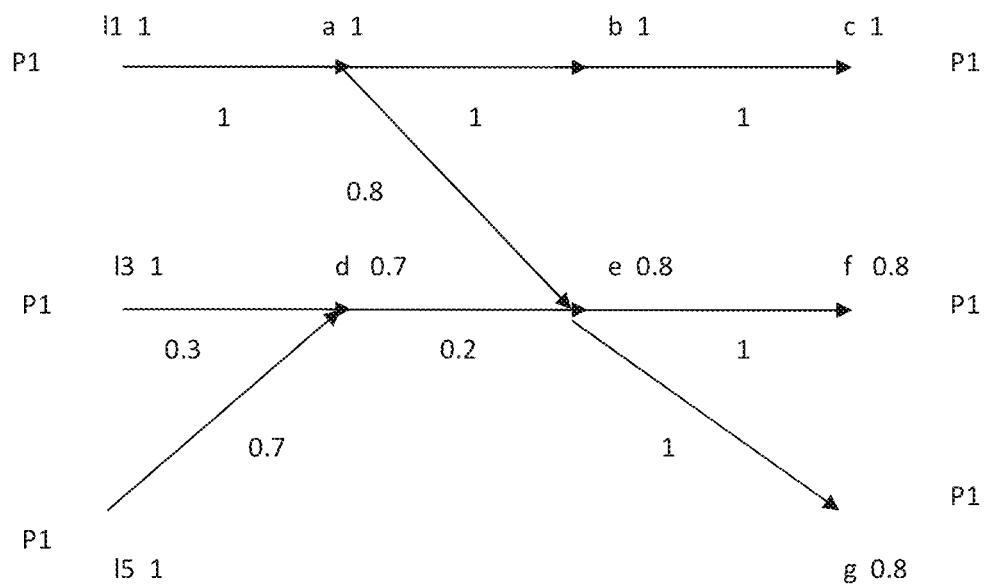
FIG. 5 shows an example timing graph of forward propagation in the presence of uniform timing constraint.

The engine of forward propagation using BFS 107 in the presence of uniform timing constraint is further illustrated by referring to FIG. 3, FIG. 4 and the timing graph FIG. 5. A simple sequential circuit with 6 flip-flops is shown in FIG. 3 and the clock phases P1 and P2 are shown in FIG. 4. In the case of uniform timing constraint it is assumed that L1-L6 are positive edge-triggered flip-flops, and all of them are controlled by the rising clock edge of clock phase P1. Initially the outputs of flip-flops 11, 13, and 15 as shown in FIG. 5 are put into queue 201 and start processing queue elements if queue is not empty 202. After processing 13 and 15, fanout gate D 203 is checked. D begin to be evaluated since two inputs have been visited 204. MAX(13,15) is calculated and the latest arrival time at d in terms of a random variable is obtained 204. Note that the node name and the random variable associated with the node are expressed by the same symbol for the sake of clarity. For example 13 refers to both node and its random variable. The probabilities from 13 to d and from 15 to d are calculated to be 0.3 and 0.7, respectively. The next step is to update accum_prob at d. Since the accum_prob is assigned 1 at the starting signals 11, 13 an 15, then accum_prob at d is max(1*0.3,1*0.7)=0.7 204. Since d is not input of flip-flop 205, so it is put into queue 206. At node a, b, and c, it is easy to see accm_prob is for 1, since they are the outputs of single input gates. Similarly, by evaluating gate E in FIG. 3, the probabilities 0.8 and 0.2 from a to e and d respectively are obtained and accum_prob at e is max(1*0.8,0.7*0.2)=0.8. Then, at nodes c, f, and g which are inputs to the flip-flops 205, the accum_prob are 1, 0.8, and 0.8. The arrival times at c, f, and g have been computed. By knowing the timing constraint say from L3 to L4, and the arrival time at f, it is straightforward to calculate the probability P for the failure of the path from 13 to f 207. For example, the quadratic function with Gaussian random variables for the latest arrival time at the said node f is $D=a+bx+cx^2$ and timing constraint is T, then the said probability is to integrate the normalized Gaussian function $1/\sqrt{2\pi}\exp(-(y^2))$ with respect to the whole space of y $$P=\int_{D>T} 1/\sqrt{2\pi}\exp(-(y^2))dy$$

Here y can be a vector with several process parameters.

Figure 6:
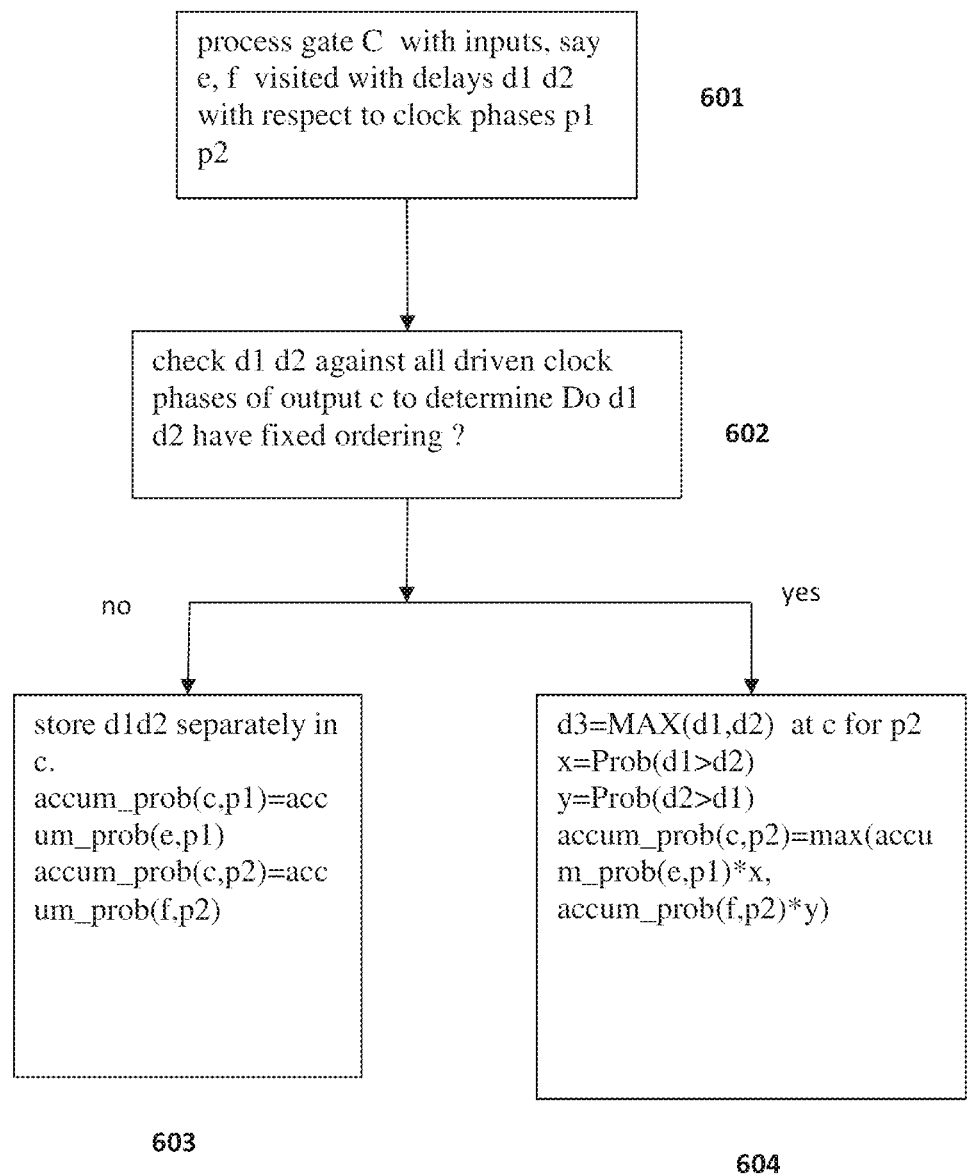
FIG. 6 is the flowchart for the algorithm of forward propagation with non-uniform timing constraint.
Figure 7:
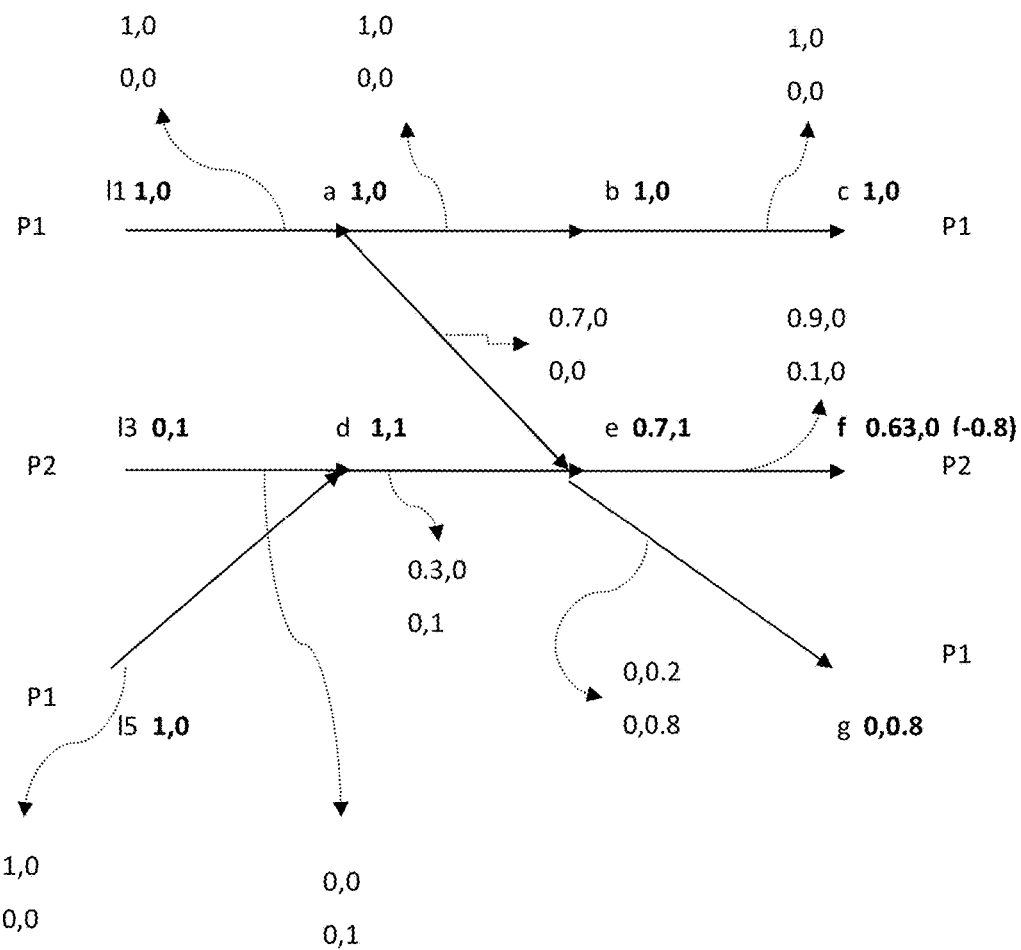
FIG. 7 is the timing graph showing an example of criticality calculation results for the example circuit with non-uniform timing constraints.

FIG. 6 is the flowchart for the algorithm of 107 with non-uniform timing constraint. Still referring to FIG. 3 for the sequential circuit and FIG. 4 for the clock phases, here we assume that L1-L6 are positive edge-triggered flip-flops, L3 and L4 are controlled by the rising clock edge of clock phase P2, while the remaining flip-flops are controlled by the rising edge of P1. Referring to the flowchart in FIG. 6 and the timing graph as shown in FIG. 7, signals start propagating from outputs of flip-flops 11, 13, and 15 similar to FIG. 2 201 202 and process gate when all inputs are visited 203. The difficulty for non-uniform case can be understood by the processing of gate D in FIG. 3. The inputs 13 and 15 store latest arrival times with respect to rising edge of clock phases P2 and P1 601, respectively. However, at node d driven clock phases are P1 and P2 602, instead of only one clock phase either P1 or P2. This means at node d we must store two latest arrival times with respect to both P1 and P2 603. To be more specific, choose any pair of clock phases from the two inputs, add input delays to the latest arrival times with the two clock phases, compare with all driven clock phases 602. If the ordering of these two clock phases is not fixed, then latest arrival times for these two clock phases must be stored in the output d of the said gate D 603. This part in fact is similar to that used in STA addressed in detail by Chang elsewhere. In SSTA, the nominal numbers in the random variable of the latest arrival time are used to determine the clock phases with respect to which the latest arrival times at node d in terms of random variable are stored. In SSTA, the accumulated path probability with respect to each clock phase stored at the said node d is needed. In the case of the said gate D with inputs 13 and 15, output d, the accum_prob at 13 with respect to clock phase p2 is 1, so is accum_prob at 15 with respect to clock phase P1. Since the latest arrival time at node d still contain two clock phases without merging them into a single phase, the probability for the signal from 13 with respect clock phase p2 propagating to node d still with respect to P2 expressed as edge_prob(13,d,P2,P2) is 1. That is why accum_prob at node d with respect to P2 denoted at accum_prob(d,P2) is accum_prob(13,P2)*edge_prob(13,d,P2,P2)=1 and the same applies to accum(d,P1)=1 603. Besides, the input to output probability must be retrieved when doing path tracing back. The aforementioned probability edge_prob(13,d,P2, P2) associated with each clock phase of the input and each clock phase at the output is stored into the clock phase of the input. The forward propagation process stops when all signals have reached inputs of destination flip-flops. The delay variables for these nodes have been obtained. Probability for failure at the said node can be computed from the delay variable and its timing constraint. If the probability is greater than the user specified threshold probability, the difference is slack in terms of probability, not in terms of time. For example, the quadratic function with Gaussian random variables for the latest arrival time at the said node is $D=a+bx+cx^2$ and timing constraint is T, then the said probability 207 is to integrate the normalized Gaussian function $1/\sqrt{2\pi}\exp(-(y^2))$ with respect to the whole space of y $$P=\int_{D>T} 1/\sqrt{2\pi}\exp(-(y^2))dy$$

Continue referring to FIG. 3 and now gate F with input e and output f is being processed. Node e stores the latest arrival times d1 and d2 separately with respect to both clock phases P1 and P2 by the same reason as processing gate D is discussed. However, there is only one driven clock phase of node f, namely clock phase P2. Therefore, by comparing P1 and P2 stored in node e against the driven clock phase P2 as far as timing constraint is concerned, these P1 and P2 in e have fixed ordering and MAX(d1,d2) is operated with the result d3 being stored into node f. Prob(d1>d2) and Prob (d2>d1) for the probabilities for d1>d2 and d2>d1 are also calculated. In fact based on the previous notation, we have $$\text{edge\_prob}(e,f,P1,P1)=\text{Prob}(d1>d2)$$

in which e and f refer to input and output node, and the 3rd argument is the clock phase the delay at input is associated with, and the 4th argument is the clock phase the delay at output is associated with. Then, edge_prob(e,f,P2,P1)=Prob(d2>d1) follows similarly.

As accum_prob at node f, since d3 is measured from phase P1, and there are two paths from e to f with two different clock phases. The correct accum_prob 604 is obtained as follows, $$\text{accum\_prob}(f,P1)=\max(\text{accum\_prob}(e,P1)*\text{Prob}(d1>d2), \text{accum\_prob}(e,P2)*\text{Prob}(d2>d1))$$

Similar to the case of uniform timing constraint, the forward propagation of the signals stop when the signals have reached inputs of destination flip-flops and the probability for failure at the said nodes are calculated 207.

FIG. 7 is the timing graph showing an example of criticality calculation results for the circuit in FIG. 3 with non-uniform timing constraints. First, in multi-phase circuit the accum_prob at each node is expressed as a vector for each phase. At 11, 13, and 15 the accum_prob are (1,0), (0,1) and (1,0), meaning at 11 the accum_prob is 1 with respect to P1, at 13 the accum_prob is 1 with respect to P2, and at 15 the accum_prob is 1 with respect to P1. At node d the latest arrival times are calculated from the latest arrival times at node 13 and 15 plus the delays from 13 to node d and 15 to d, respectively. These two the latest arrival times at node d from 13 and 15 with different phases are not merged, so the probability from input 13 or 15 to output d is 1 for each phase. As to the edge between 13 and d, a 2×2 matrix is given with the 1st row storing probability from 1st input, which is 13, with phase P1 to output phases P1 and P2, respectively, and 2nd row being for input 13's phase P2 to output phases P1 and P2 at node d, respectively. Nodes a and e store delay with respect to phase P1, they both go through MAX operation to achieve the longest delay also with respect to P1. The probability for the edge from a to e is 0.7 while the probability from d to e is 0.3 for P1. This is why the edge matrix probability from a to e is $$P = \begin{bmatrix} 0.7, 0 \\ 0, 0 \end{bmatrix}$$

Using the previous notation for edge_prob, we have $P_{11}$=edge_prob(1,e,P1,P1).

Note that the 2nd row is (0,0) because input a does not have any delay associated with P2. Since node a does not store the longest delay with respect to P2, the longest delay with respect to P2 in node d does not merge with any delay from a, meaning the probability of the delay from d with respect to phase P2 goes to node e also with respect to P2 is 1. This explains the matrix edge probability P between d and e is $$P = \begin{bmatrix} 0.3, 0 \\ 0, 1 \end{bmatrix}$$

With the information of accum_prob at nodes a and d, and the edge matrix probabilities between edges a to e and d to e, the accum_prob at node e is obtained easily.

$$\text{accum\_prob}(e,P1)=\max(\text{accum\_prob}(a,P1)*\text{edge\_prob}(a,e,P1,P1),$$

$$\text{accum\_prob}(d,P1)*\text{edge\_prob}(d,e,P1,P1))=\max(1*0.7,1*0.3)=0.7$$

$$\text{accum\_prob}(e,P2)=1$$

This is how we get 0.7,1 for node e in FIG. 7. As to node e, the longest delay times are stored with respect to clock phases P1 and P2. By adding the delay from node e to f, we get the longest delays d1 and d2 associated with P1 and P2. Due to the fact that there is only one driven clock phase P2 at node f, d3=MAX(d1,d2) is used and d3 is with respect to P1 only. Assuming we have Prob(d1>d2)=0.9, Prob(d2>d1)=0.1, giving rise to edge_prob(e,f,P1,P1)=0.9 and edge_prob(e,f,P2,P1)=0.1. In terms of edge matrix it is $$P = \begin{bmatrix} 0.9, 0 \\ 0.1, 0 \end{bmatrix}$$

$$\text{accum\_prob}(f,P1)=\max(\text{accum\_prob}(e,P1)*\text{edge\_prob}(e,f,P1,P1),$$

$$\text{accum\_prob}(e,P2)*\text{edge\_prob}(e,f,P2,P1))=\max(0.7*0.9,1*0.1)=0.63$$

$$\text{accum\_prob}(f,P1)=0.63$$

$$\text{accum\_prob}(f,P2)=0$$

In FIG. 7, it is shown as f 0.63 0.

Figure 8:
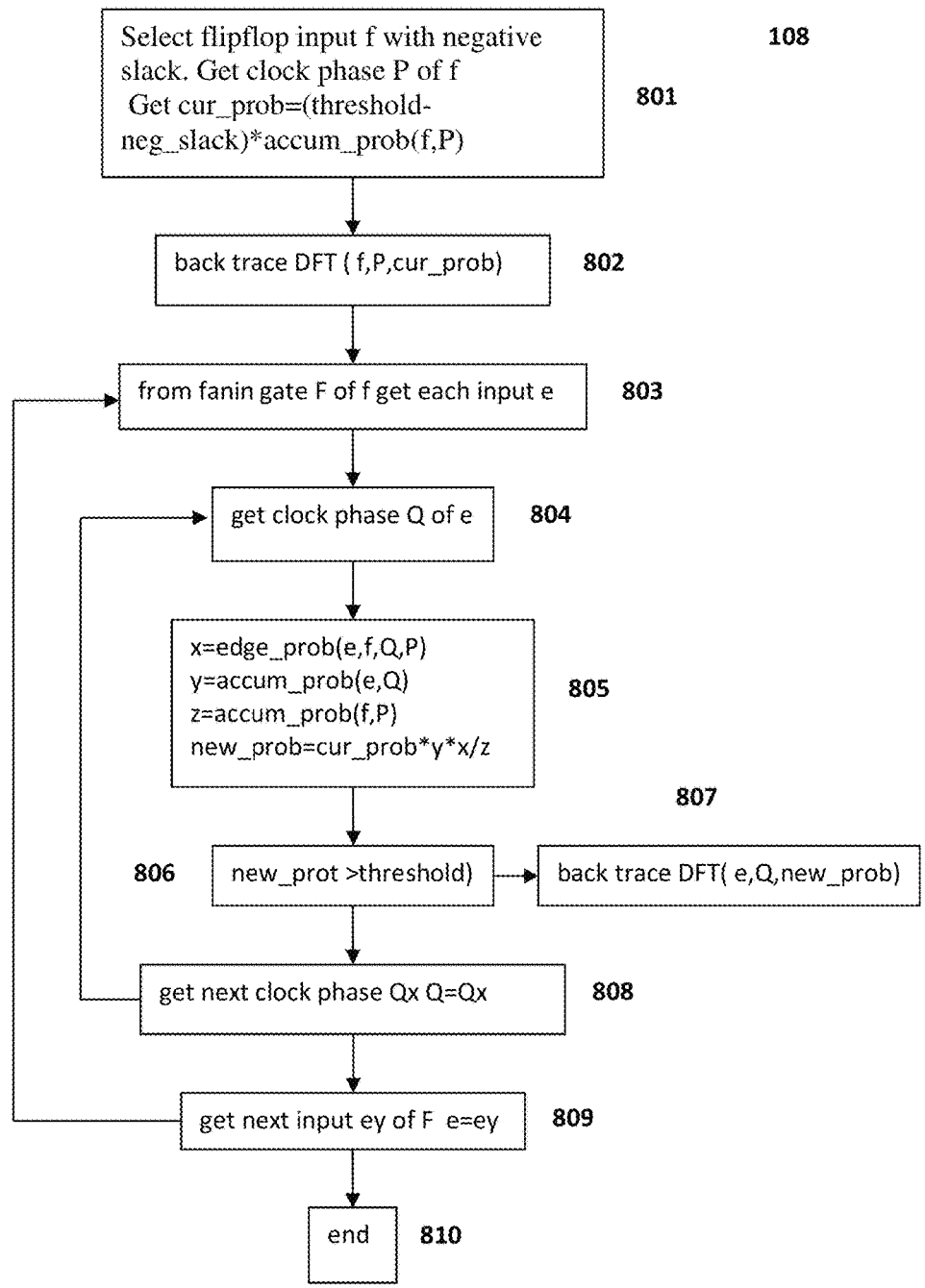
FIG. 8 is a flowchart illustrating a method for backward propagation to generate all critical paths.

This invention presents an algorithm 108 for backward propagation to generate all critical paths as shown in FIG. 8. First identify the data input of the flip-flops with negative slack, meaning the paths ending at the said node with path probability exceeding the specified threshold probability. It is noted that the accumulated probability at the said node times A in which A=user specified probability-slack is the probability of failure cur_prob for the most critical path ending at the said node 801. Search paths backward recursively based on DFT from these said nodes with arguments for node f, its clock phase P, and to only generate failing paths with their probabilities greater than the user specified threshold 802. The procedure of back trace DFT in the presence of multi-phase circuit goes as follows. Get the fanin gate of the said node and the input e of the said fanin gate F 803. The purpose is to determine if there are paths coming from the said input e to the said node f exceeding the user specified threshold probability. The said nodes e and f store the nominal and variation terms of latest arrival times for various independent clock phases and we choose one clock phase of e, say Q 804, for illustration purpose. We obtain the following quantities, $$x=\text{edge\_prob}(e,f,Q,P)$$

$$y=\text{accum\_prob}(e,Q)$$

$$z=\text{accum\_prob}(f,P)$$

Since the most critical paths passing through node f have the probability cur_prob, then the probability for the path passing through e with clock phase Q to node f with clock phase P is 805

$$new\_prob=cur\_prob*y*x/z$$

By comparing new_prob with user specified threshold probability, it can be determined whether the path search can go beyond this node e. If so, then the process is done recursively 807. If not then the next clock phase Q of node e will be accessed and the same process continues 808. Then, when the clock phases of node e are exhausted, the next input of gate F is accessed 809 and so on until all critical paths with probability greater than user specified threshold probability.

Referring back to FIG. 7 an explicit example for back tracing with non-uniform timing constraints in SSTA is given. Here we discuss the DFT from output node f to inputs 11,13, 15. Similar discussions on the path tracing from outputs node c and g are omitted. Assume the probability of critical path failure at output node f is 0.8 and the user specified threshold probability is 0, then the slack in terms of probability at node f is −0.8 as shown in FIG. 7. If the user specified threshold probability is 0, then all paths with any probability are considered to be critical paths. As discussed in the previous context, this said critical path failure probability at node f is obtained by integrating the delay time in terms of random variable at node f with respect to the whole variation space by considering timing constraint. The purpose is to trace back from node f to find the three critical paths in FIG. 7, namely paths consisting of nodes 11→a→e→f, 13→d→e→f, and 15→d→e→f. The most critical path failure probability is 0.8*0.63=0.504. Tracing backward first to node e with phase P1 and knowing the edge_prob(e,f,P1,P1)=0.9, the new probability at node e with P1 becomes 0.7*0.9/0.63*0.504=0.504. Then search further from node e with P1 to node a with P1, the new probability at node a with P1 becomes 1.0*0.7/0.7*0.504=0.504 and then to 11 and conclude the path 11→a→e→f is the most critical path with probability 0.504. Based on DFT, the search then goes back to node e and then to node d. First with phase P1 in node d, by using accum_prob(d,P1)=1 and edge_prob(d,e,P1,P1)= 0.1, the new_prob=1*0.3/0.7*0.504=0.216. Since in this example illustrated by FIG. 7, the specified probability threshold is chosen to be 0, the new_prob is greater than specified probability threshold, therefore the searching does go beyond node d. Then, the search goes to 15 with edge_prob(15,d,P1,P1)=1, the second path 15→d→e→f with probability 0.216 is found. Since edge_prob(13,d,P1,P1)=edge_prob(13,d,P2,P1)=edge_prob(d,e,P2,P1)=0, then go backward to node e with phase P2. With edge_prob(e,f,P2,P1)=0.1, accum_prob(e,P2)=1 and accum_prob(f,P1)= 0.63, new_prob=1*0.1/0.63*0.504=0.08. Then it is simple to see that edge_prob(13,d,P2,P2)=edge_prob(d,e,P2,P2)=1 the path 13→d→e→f is found with probability 0.08. It is interesting to check that the sum of the probabilities for these three paths, namely 0.504, 0.216 and 0.08, is 0.8 exactly as expected.

Figure 9:
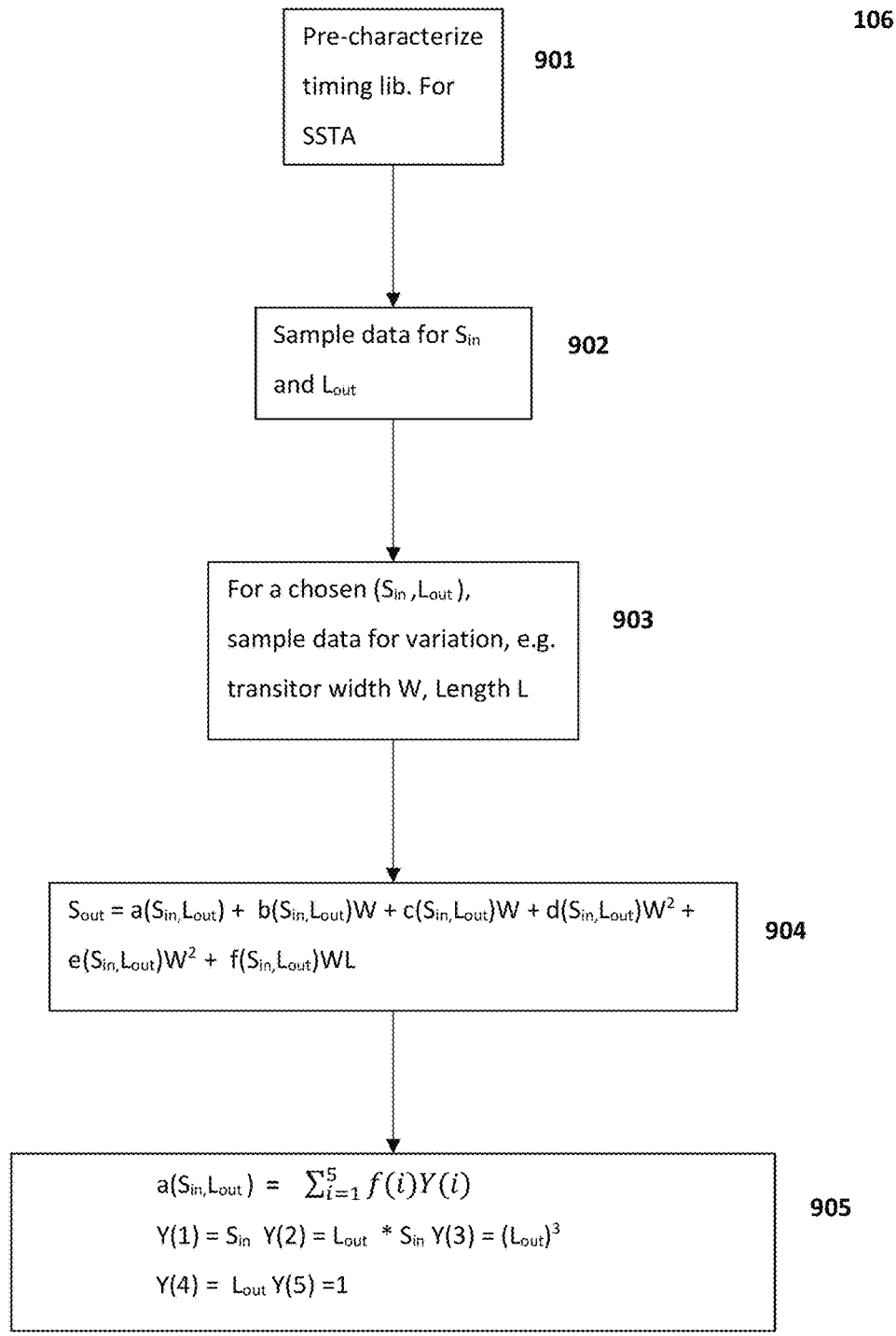
FIG. 9 is a flowchart for the algorithm of pre-characterizing cells up to the second order of variation effect.

Referring back to FIG. 1 105 for another aspect of the invention, the algorithm of pre-characterizing cells up to the second order of variation effect is discussed in FIG. 9. Pre-characterizing cell generates the mathematical equations describing the cell delay and output slew as a function of cell input slew time and cell output loading, with loading and delays being treated as random variables 901. These random variables have non-Gaussian PDF and they are expressed by the random variables with normalized Gaussian PDF due to the independent process parameters such as transistor width and transistor length etc. to the second order. We use a simple example to illustrate the concept of pre-characterizing cell with variations to the second order. The random variable of delay or slew time X is denoted by $$X=a+bx+cy+dx^2+ey^e+fxy$$

in which x and y refer to random variables for transistor width and transistor length, respectively assumed to have normalized Gaussian distribution N(0,1). If X is for cell output slew time, then the coefficients a, b, c etc. depend on the cell input slew time and output loading which are also random variables. With this understanding, the procedure of pre-characterizing cell in the presence of variation effect is described as follows. The purpose is to characterize, say output slew S as a function of input slew, output loading and transistor width, length into $$S_{out}=a(S_{in},L_{out})+b(S_{in},L_{out})W+c(S_{in},L_{out})W+d(S_{in},L_{out})W^2+e(S_{in},L_{out})W^2+f(S_{in},L_{out})WL$$

The delay of the cell from cell input to cell output denoted by $D_{in \to out}$ is discussed similarly, and there is no need to repeat it here. Since we use N(1,0) for x any y representing random variables for width W and length L, in the modeling W in fact is (W−μ)/σ assuming N(μ,σ) is the Gaussian PDF for W, and L follows the same. In the sampling for $S_{in}$ and $L_{out}$ 902, choosing one sample point and then do sampling for W and L 903, to get coefficient a, b, c, d, e, f at one chosen point for $S_{in}$ and $L_{out}$ 904. By doing this way, the data for all the sampling points for the coefficients a, b, c, d, e and f, we therefore can fit each of them into relation 905

$$a(S_{in},L_{out})=f(i)Y(i)$$

$$Y(1)=S_{in}\ Y(2)=L_{out}*S_{in}\ Y(3)=(L_{out})^3$$

$$Y(4)=L_{out}\ Y(5)=1$$

All f g and h are empirical fitting coefficient.
The explicit formula is given as follows $$S_{out}=A+Bx+x^tCx$$

where $x=(x_1,x_2,\ldots x_n)^t$ is 1×n vector representing n independent process parameters with normalized Gaussian PDF N(1,0), B is 1×n vector, and C is a n×n symmetric matrix and A is a scalar, which is the constant term. We have $$A=\Sigma_{i=1}^5 a(i)Y(i)$$

$$B_m=\Sigma_{i=1}^5 b(m,i)Y(i)$$

$$C_{mn}=\Sigma_{i=1}^5 c(m,n,i)Y(i)$$

in which $B_m$ is the mth component of vector B, while $C_{mn}$ is element of matrix C at row m and column n.

Figure 10:
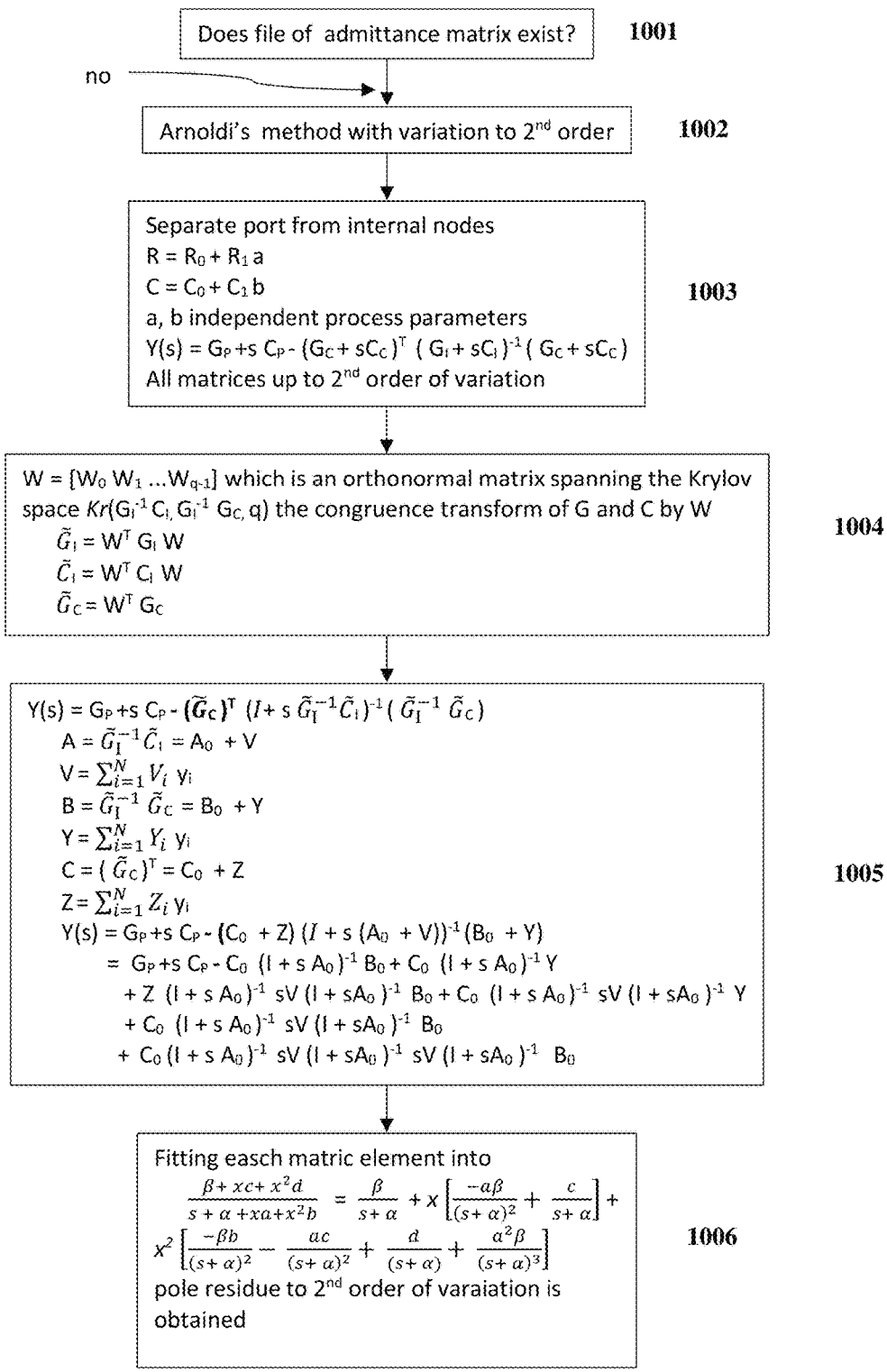
FIG. 10 is a flowchart for RLC solver of admittance matrix with variation effects to the second order.

The SSTA engine is further complicated by the variation effects due to the RLC interconnect by referring to 104 in FIG. 1. As in the case of STA in the presence of RLC interconnect, effective capacitance approach is used in the case of the gate driving the interconnect delay and the cross-talk problems using both the well-known admittance matrix and voltage transfer which are expressed in terms of pole and residue format as a function of variation parameters by referring to the file 105 FIG. 1. This invention presents an algorithm of 104 for RLC solver as shown in FIG. 10. First, the algorithm checks whether the file containing admittance matrix and voltage transfer already exists 1001. If so, then skip the procedures of re-computing admittance matrix and voltage transfer and directly read information from the said file. Otherwise, the well-known Arnoldi's method is adopted by including variation effects 1002. First, we review the basic steps in formulating this problem. For RLC circuit using modified nodal analysis (MNA) in frequency domain without variations as follows, $$(G+sC)x=b$$

In MNA there are two types of elements, type 1 elements are nodal voltages and type 2 elements are branch currents respectively. The matrix G consists of time independent elements, while matrix C handles time dependent elements such as capacitors. The vector b contains nonzero external current at the ports and zero for the remaining components. By separating the ports from the remaining nodes, the above equation is further partitioned into $$\left[\begin{bmatrix} G_P & G_C^T \\ G_C & G_I \end{bmatrix} + s \begin{bmatrix} C_P & C_C^T \\ C_C & C_I \end{bmatrix}\right] \begin{bmatrix} x_P \\ x_I \end{bmatrix} = \begin{bmatrix} b_P \\ 0 \end{bmatrix}$$

Assuming there are m ports and n internal nodes in RLC circuit, here $x_p$ are the m port node voltages and $x_i$ include n internal node voltages and l inductor currents. $G_P$ is m×m matrix for m ports, so is $C_P$. $G_I$ and $C_I$ are (l+n)×(l+n) matrices representing n internal nodes and l inductors. Both $G_C$ and $C_C$ are (l+n)×m connection conductance and susceptance matrices, respectively. The right hand side is a (m+l+n)×m matrix with $b_P$ as being the external current at the m port nodes. The admittance Y(s) is defined as $$Y(s)x_P(s)=b_P(s)$$

Through some calculation by eliminating $x_i$, by following Kerns formulation without considering variations Y(s) is obtained as follows, $$Y(s)=G_P+sC_P-(G_C+sC_C)^T(G_I+sC_I)^{-1}(G_C+sC_C)$$

Kerns and Yang have pointed out that by using Cholesky factorization $G_I$ can be transformed into unit matrix. Since this part will not affect the later discussions, it is omitted for the sake of brevity.

Our purpose is to calculate Y(s) as a function of variation parameters to the second order and express each matrix component of Y(s) in terms of pole and its residue to the second order effect due to variations. The conductance and susceptibility matrices can be formulated in powers of variation parameters. For example, resistance being assumed as a Gaussian random variable expressed as $$R=R_0+R_1 a$$

Similarly capacitance C has Gaussian distribution like $$C=C_0+C_1 b$$

Here $R_0$ and $C_0$ are nominal values and a and b are two independent variation parameters for resistance and capacitance, respectively 1003. By using these, it is straightforward to evaluate G and C matrices in powers of a and b. We have $$G_I=G_{I,0}+V$$

$$V=\Sigma_{i=1}^N G_{I,i} V_i$$

Here $V_i$ stands for ith random variable up to the second order. For example if there are two random parameters a and b, then $V_i$ can be one of random variables a, b, ab, $a^2$, and $b^2$ in which a and b are independent process parameter with normalized Gaussian distribution N(0,1). The nominal value of $G_I$ is $G_{I0}$ and $G_{I_i}$ is the coefficient matrix of random variable $y_i$. The matrices $C_P$, $G_P$, $C_P$, $G_C$ and $C_C$ are all defined similarly. To simplify the calculation the congruence transform is carried out by using $$X = \begin{bmatrix} I & 0 \\ -C_i^{-1}C_C & I \end{bmatrix}$$

After the congruence transform $X^T G X$ and $X^T C X$ the connection susceptibility matrix $C_C$ becomes zero and Y(s) still remains the same. It is noted that the above mentioned X has V dependency. In the calculation we need to preserve up to $V^2$ term since V contains 1st order of random variable and we need computation to the 2nd order. For example, $$G_I^{-1}=(G_{I,0}+V)^{-1}=(I+G_{I,0}^{-1}V)^{-1}G_{I,0}^{-1}=G_{I,0}^{-1}-G_{I,0}^{-1}VG_{I,0}^{-1}+G_{I,0}^{-1}VG_{I,0}^{-1}V G_{I0}^{-1}$$

Note that the square terms for the random variables in V doesn't contribute in $V^2$ since we only need up to the 2nd order term of random variable. Therefore, X can be calculated to be $$X=X_0+V$$

$$V=\Sigma_{i=1}^N X_i v_i$$

Where $X_0$ is the nominal part of X, V is the variation part consisting N variational terms up to the second order of each independent variation parameter and $X_i$ is the coefficient of each variation term $v_i$.

For the sake of brevity of notation we stick to the same formula for Y(s) after congruence transform by X with the understanding that Cc is zero and the remaining matrices still up to the 2nd order of random variables but with different matrix coefficients. The admittance matrix Y(s) can then be written as $$Y(s)=G_P+sC_P-(G_C)^T(I+sG_I^{-1}C_I)^{-1}(G_I^{-1} G_C)$$

The next step is to use Arnoldi's procedure in finding the orthonormal bases $[W_0, W_1, \ldots W_{q-1}]$ for the Krylov space $Kr(G_I^{-1} C_I, G_I^{-1} G_C, q)$ for matching q moments of the multiport admittance. We start with $W_I$, which is $G_I^{-1} G_C$ and followed by QR decomposition if the circuit has more than one port. It is worth noting that in QR process, we need to get vector divided by its norm. Here we use a simple example to illustrate this concept. Assuming there is one random parameter x, a vector with two components up to the second order of x is something like $$\begin{bmatrix} 4+2x+3x^2 \\ 3+x+2x^2 \end{bmatrix}$$

The norm is obtained by first taking the square $$(4+2x+3x^2)^2+(3+1x+2x^2)^2=(16+16x+28x^2)+(9+6x+13x^2)=25+22x+41x^2$$

Then square root is in the format of $(a+bx+cx^2)$, and we easily get $5+2.2x+7.232x^2$. As to $W_2$, $W_3$ etc. they are obtained through standard procedure of Gram-Schmidt orthogonalization. We end up with the Arnoldi vector Wi (i=0, 1 ... q−1) with variation effect as follows $$W_i=W_{i0}+M$$

$$M=\Sigma_{m=1}^N W_{i,m} v_m$$

Here $W_{i0}$ is the nominal part of ith vector $W_i$, and $W_{i,m}$ is the coefficient of the mth random parameter $v_m$ which may contain second order of independent random variable. Set $W=[W_0 \ W_1 \ \ldots \ W_{q-1}]$ which is an orthonormal matrix spanning the Krylov space $Kr(G_I^{-1} \ C_I, \ G_I^{-1} \ G_C, \ q)$. To preserve passivity of the circuit, the congruence transform of G and C by W is 1004

$$\tilde{G}_I = W^T G_I W$$

$$\tilde{C}_I = W^T C_I W$$

$$\tilde{G}_C = W^T G_C$$

$$Y(s) = G_P + sC_P - (\tilde{G}_C)^T (\tilde{G}_I + s\tilde{C}_I)^{-1} (\tilde{G}_C)$$

Now we are in the position to calculate poles and residues with variation terms. Y(s) is rewritten as follows, $$Y(s) = G_P + sC_P - (\tilde{G}_C)^T (I + s\tilde{G}_I^{-1}\tilde{C}_I)^{-1} (\tilde{G}_I^{-1}\tilde{G}_C)$$

$$A = \tilde{G}_I^{-1}\tilde{C}_I = A_0 + V$$

$$V = \Sigma_{i=1}^N V_i y_i$$

$$B = \tilde{G}_I^{-1}\tilde{G}_C = B_0 + Y$$

$$Y = \Sigma_{i=1}^N Y_i y_i$$

$$C = (\tilde{G}_C)^T = C_0 + Z$$

$$Z = \Sigma_{i=1}^N Z_i y_i$$

Note that A is the reduced matrix by Arnoldi method by considering variation effects up to the 2nd order of random parameters. Here we have 1005

$$\begin{aligned} Y(s) &= G_P + sC_P - (C_0 + Z)(I + s(A_0 + V))^{-1}(B_0 + Y) \\ &= G_P + sC_P - C_0(I + sA_0)^{-1}B_0 + C_0(I + sA_0)^{-1}Y + \\ &\quad Z(I + sA_0)^{-1}sV(I + sA_0)^{-1}B_0 + \\ &\quad C_0(I + sA_0)^{-1}sV(I + sA_0)^{-1}Y + \\ &\quad C_0(I + sA_0)^{-1}sV(I + sA_0)^{-1}B_0 + \\ &\quad C_0(I + sA_0)^{-1}sV(I + sA_0)^{-1}sV(I + sA_0)^{-1}B_0 \end{aligned}$$

calculated to the 2nd order of random parameters. The variation parts V, Y, and Z contain second order terms, so the quadratic terms like sV sV only contain 2nd order terms. Since $A_0$ is the reduced matrix without variation, this matrix can be diagonalized by using congruence transform U consisting of eigenvectors of $A_0$. For the sake of brevity of notation, $A_0$ is diagonalized matrix containing the eigenvalues of the original $A_0$. The matrix V after the congruence transform U cannot be diagonalized. The right hand matrices $B_0 = U^T B_0$, $Y = U^T Y$ and the left hand matrices $C_0 = UC_0$, $Z = UZ$. By simple observation for each matrix element of Y(s) it can have the form of simple, double, and cubic pole etc. However, we need to express simple pole and residue with its variation terms. Here we adopt the method by expanding pole and residue form in powers of variation parameters and compare with the exact solution of Y(s) to obtain the coefficients of variation terms for pole and residue. The procedure can be illustrated by the following example. Assuming there is only one random parameter x with the pole and residue form can be shown as follows 1006

$$\frac{\beta + xc + x^2 d}{s + \alpha + xa + x^2 b} = \frac{\beta}{s+\alpha} + x\left[\frac{-a\beta}{(s+\alpha)^2} + \frac{c}{s+\alpha}\right] +$$

$$x^2 \left[\frac{-\beta b}{(s+\alpha)^2} - \frac{ac}{(s+\alpha)^2} + \frac{d}{(s+\alpha)} + \frac{a^2\beta}{(s+\alpha)^3}\right]$$

The purpose is to find coefficients for random parameter x for the pole $-\alpha$ and residue $\beta$. By comparing with the exact result from Y(s) in powers of x and $1/(s+\alpha)$ we can obtain a and c from x term and b and d from $x^2$ term. Note that in this example $1/(s+\alpha)^3$ term for $x^2$ term in fact is not needed, since the unknown a in the coefficient $a^2\beta$ has already been obtained in the other terms.

Figure 11:
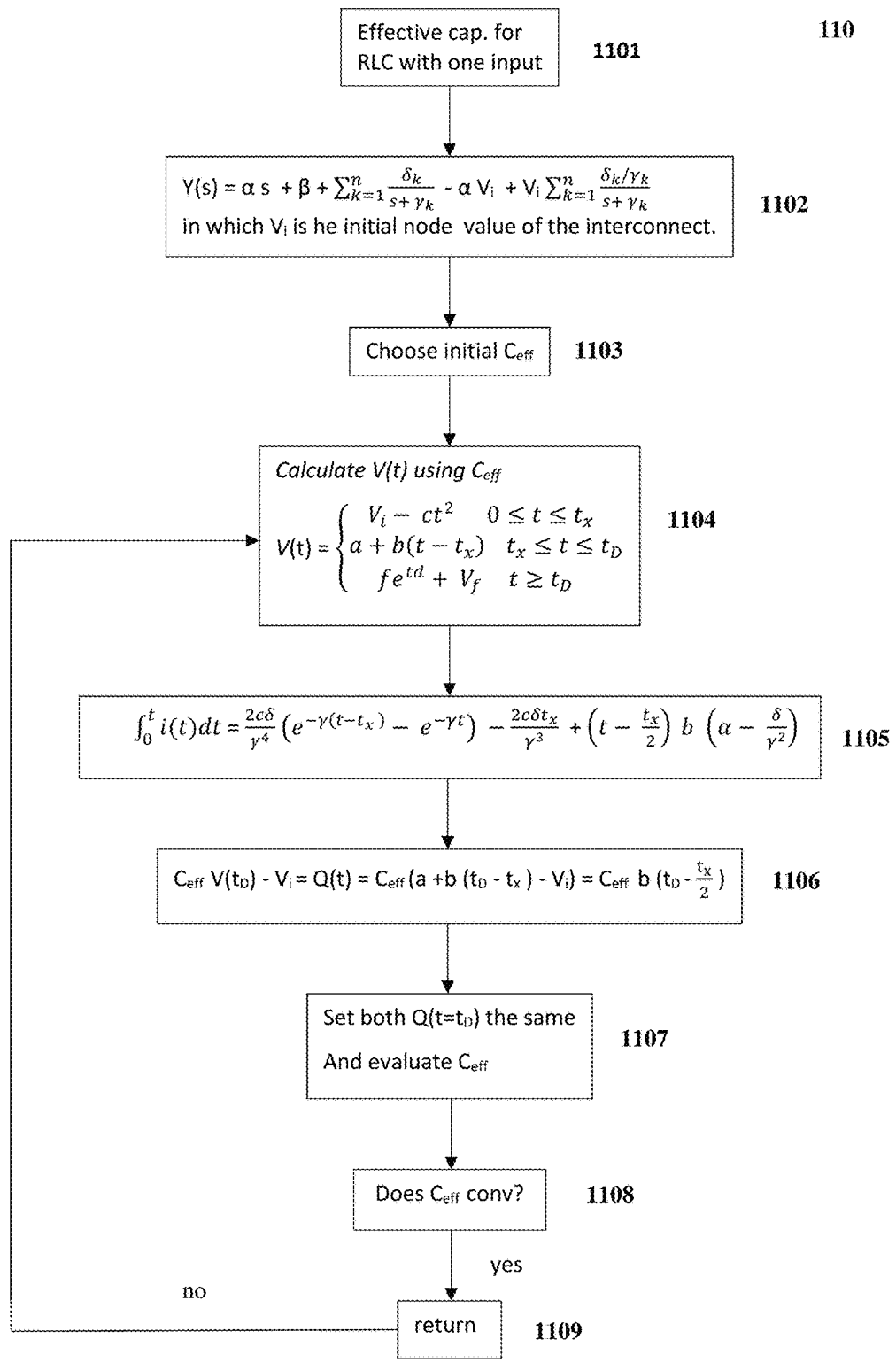
FIG. 11 is a flowchart calculating the effective capacitance in the presence of variation effect to the second order with one port in RLC.

Referring back to FIG. 1 110 for another aspect of the invention, the method in calculating the effective capacitance in the presence of variation effect is further discussed in FIG. 11 with one port 1101 after we have obtained the admittance matrix in terms of poles and residues expressed in powers of variation parameters read from file 105. The well-known criterion is used in obtaining effective capacitance, namely requiring the charge injected into the driving node of RLC interconnect from the driving gate using effective capacitance to be the same as that as obtained by using voltage at the said driving node and the admittance matrix for the RLC. Here we illustrate this method by using an example for the voltage wave form at the driving node of RLC, although the method is readily apparent to those of ordinary skill in the art for different types of voltage waveform. Here we have $$V(t) = \begin{cases} V_i - ct^2 & 0 \le t \le t_x \\ a + b(t - t_x) & t_x \le t \le t_D \\ fe^{xd} + V_f & t \ge t_D \end{cases}$$

Figure 12:
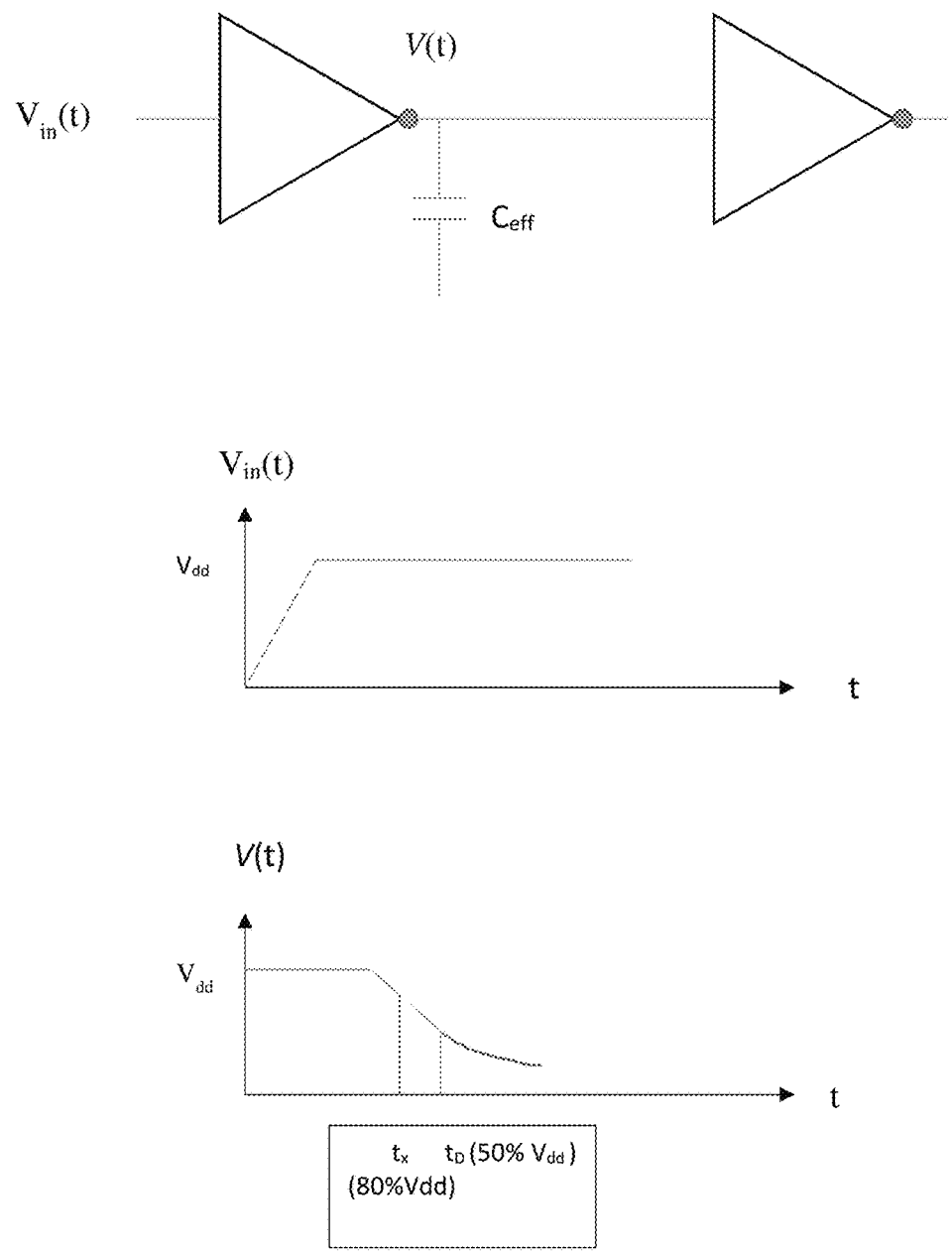
FIG. 12 shows an example circuit with the driver's immediate output waveform in terms of $t_x$ and $t_D$.

As shown in FIG. 12, the origin of time is chosen to be the point where the input of the driver starts making transition, $V_i$ is the initial value Vdd (0) when V(t) is in fall(rise) transition, and $V_f$ is the final node value Vdd (0) when V(t) is in rise(fall) transition. In the following discussion we assume $t_0$ is 0. We define $t_x$ to be the time when the voltage falls(rises) to 80%(20%) of Vdd. In FIG. 11, the admittance is written as follows assuming there is one port 1102.

$$i(s) = Y(s)V(s) + I_{init} = \left(\alpha s + \beta + \sum_{k=1}^n \frac{\delta_k}{s+\gamma_k}\right)V(s) - \alpha V_i + V_i \sum_{k=1}^n \frac{\delta_k/\gamma_k}{s+\gamma_k}$$

in which $V_i$ is he initial node value of the interconnect, and i(s) is the Laplace transform of the current i(t) at the said driving node of RLC interconnect. We require that $$Q(t) = C_{eff} \int_0^{t_D} \frac{dV(t)}{dt} dt =$$

$$C_{eff} V(t_D) - V_i = \int_0^{t_D} i(t) dt = \int_0^{t_D} \mathcal{L}^{-1}(Y(s)V(s) + I_{init}) dt$$

Here $\mathcal{L}^{-1}$ is the inverse Laplace transform and V(s) is the Laplace transform of V(t) as already defined 1104. The value of $C_{eff}$ is achieved by using the above formula iteratively. The initial choice of $C_{eff}$ can be chosen to be the total routing capacitance 1103. The above formula is evaluated as follows. To make notation simple, δ and γ are used in replacement of $\delta_k$ and $\gamma_k$ without loss of generality. We have $$\mathcal{L}^{-1}\left(\left(\frac{\delta}{s+\gamma}\right)V(s)\right) = \frac{\delta}{\gamma}V(t) - V_i\frac{\delta}{\gamma}e^{-\gamma t} - \frac{\delta}{\gamma}e^{-\gamma t}\int_0^t e^{\gamma x}V'(x)dx$$

$$\mathcal{L}^{-1}\left(\left(\frac{\delta/\gamma}{s+\gamma}\right)V_i\right) = V_i\frac{\delta}{\gamma}e^{-\gamma t}$$

$$\mathcal{L}^{-1}(\alpha s V(s) - \alpha V_i) = \alpha V'(t)$$

$$\mathcal{L}^{-1}(\beta V(s)) = \beta(t)$$

Making use of $$\beta + \sum_{k=1}^n \frac{\delta_k}{\gamma_k} = 0$$

We obtain 1105

$$i(t) = \mathcal{L}^{-1}(Y(s)V(s) + I_{init}) = -e^{-\gamma t}\frac{\delta}{\gamma}\int_0^t e^{\gamma x}V'(x)dx + \alpha V'(t)$$

$$\int_0^t i(t)dt = \frac{2c\delta}{\gamma^4} - \frac{2c\delta t}{\gamma^3} - \frac{2c\delta}{\gamma^4}e^{-\gamma t} - ct^2\left(\alpha - \frac{\delta}{\gamma^2}\right)t \le t_x$$

$$\int_0^t i(t)dt = \frac{2c\delta}{\gamma^4}(e^{-\gamma(t-t_x)} - e^{-\gamma t}) - \frac{2c\delta t_x}{\gamma^3} + \left(t - \frac{t_x}{2}\right)b\left(\alpha - \frac{\delta}{\gamma^2}\right)t_x \le t \le t_D$$

$$\int_0^t i(t)dt = \frac{\delta}{\gamma^2}e^{-\gamma t}(A+B+C) + \left(\alpha - \frac{\delta}{\gamma^2}\right)(fe^{td} + V_f - V_i)t \ge t_D$$

where $$A = (-2c)\left(-\frac{1}{\gamma^2}e^{\gamma t_x} + \frac{t_x}{\gamma}e^{\gamma t_x} + \frac{1}{\gamma^2}\right)$$

$$B = \frac{b}{\gamma}(e^{\gamma t_D} - e^{\gamma t_x})$$

$$C = fd\frac{1}{d+\gamma}(e^{t(d+\gamma)} - e^{t_D(d+\gamma)})$$

Note that in the above formulae, the pole γ and residue δ refer to one of the poles and residues, and the summation with respect to all poles and residues are implied. The constant α then is independent of the summation of each pair of pole and residue. All the constants have variation terms to the second order. The coefficients b and c, and delays $t_D$ and $t_x$ are also random variables calculated by using pre-characterized timing library with variations from input slew time and output loading based on $C_{eff}$ during the process of iteration until the final $C_{eff}$ is obtained. Therefore, with all of terms such as poles, residues, $t_x$ and $t_D$ being calculated to the 2nd order of random parameters, the term Q(t) up to the 2nd order of random parameters can also be achieved. For example, in calculating $Q(t=t_D)$, we have one term like $e^{\gamma t_D}$ with $\gamma=\gamma_{nom}+X$ and $t_D=t_{D,nom}+Y$ in which X and Y include variation terms up to 2nd order. Then, $e^{\gamma t}(t=t_D)=e^{\gamma_{nom}t_{D,nom}}(1+Xt_{D,nom}+Y\gamma_{nom}+XY\ t_{D,nom}\gamma_{nom}+X^2\ t_{D,nom}^2+Y^2\gamma_{nom}^2+2XYt_{D,nom}\gamma_{nom})$. By combining the coefficients of the same random parameter with the same order, $e^{\gamma t}(t=t_D)$ becomes $e^{\gamma_{nom}t_{D,nom}}Z$ where Z contain variation terms up to 2nd order. The calculation is straightforward but very tedious, so the final formula up to the 2nd order is not given here. Eventually we obtain $Q(t=t_D)=Q_0+W$ with W being the variation term up to 2nd order of variation effects. Using 1106

$$C_{eff}V(t_D) - V_i = Q(t) = C_{eff}(a + b(t_D - t_x) - V_i) = C_{eff}b\left(t_D - \frac{t_x}{2}\right)$$

$C_{eff}$ is reevaluated 1107, and using new $C_{eff}$, which is a random variable up to 2nd order of random parameter, to obtain new constants such as $t_D$, $t_x$, a, b, c and achieve new Q(t) accordingly. This process is iterated until convergence 1108.

Figure 13:
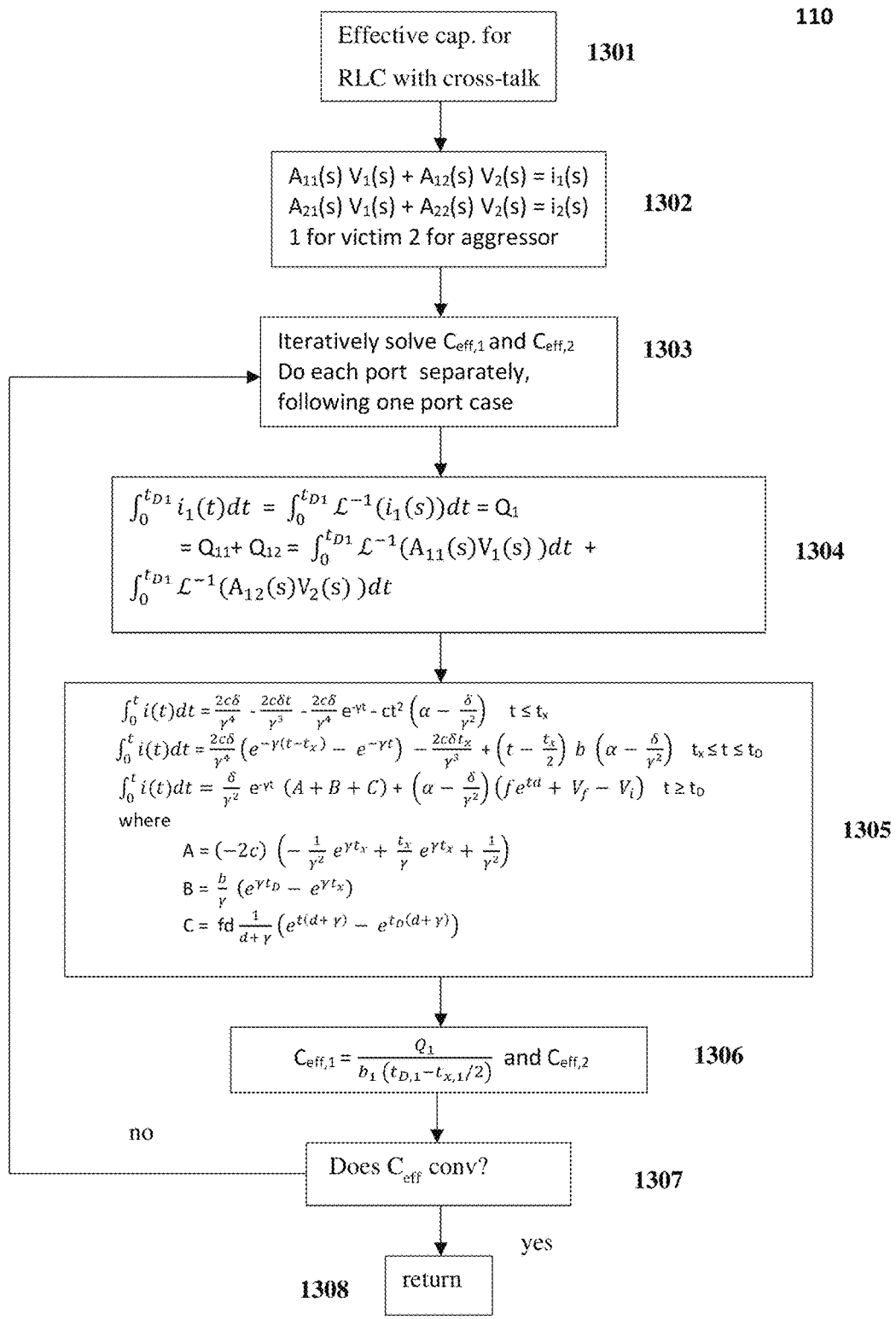
FIG. 13 is a flowchart calculating the effective capacitance in the presence of variation effect to the second order with cross-talk in RLC.
Figure 14:
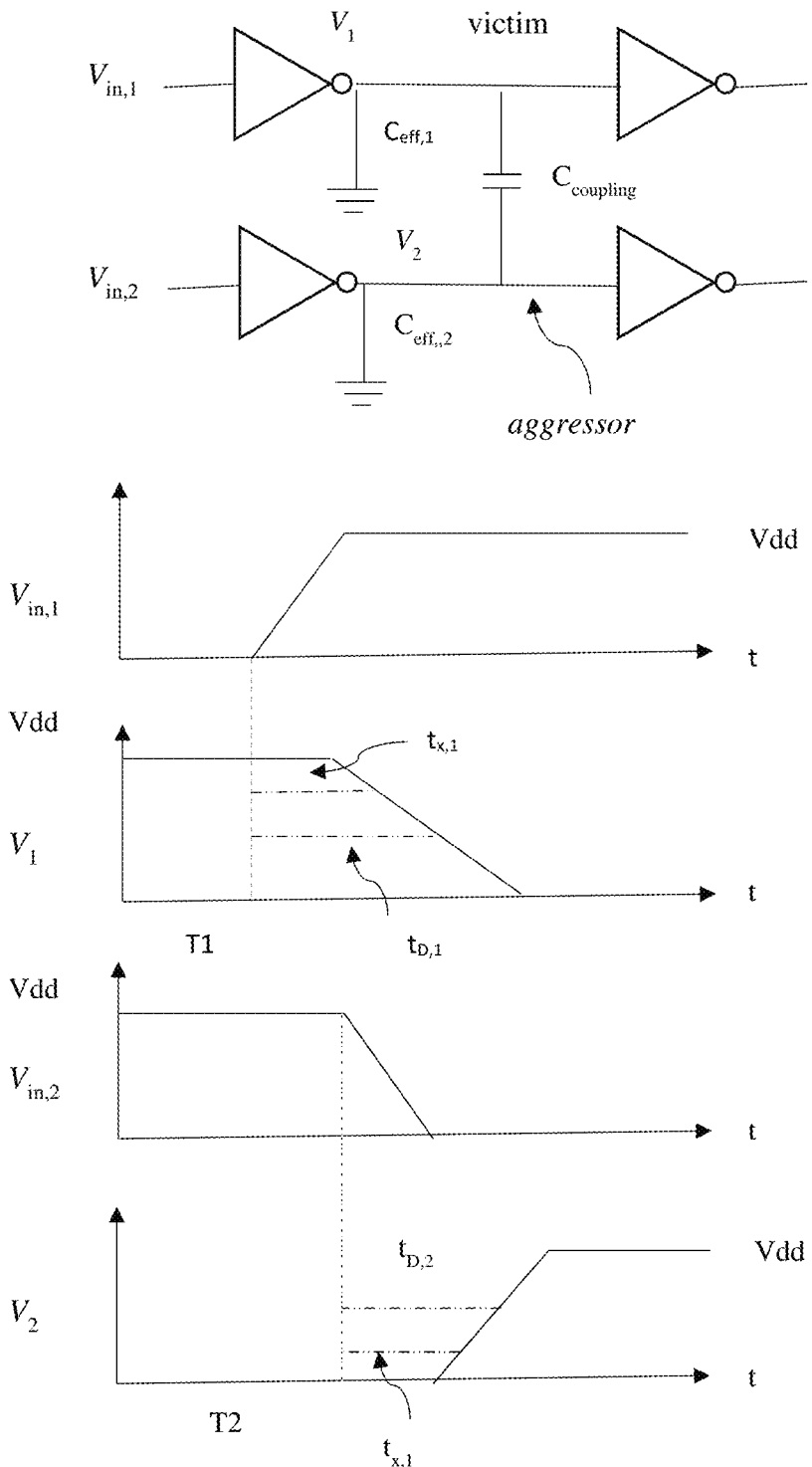
FIG. 14 shows an example circuit illustrating the victim's and aggressor's immediate output waveforms in terms of $t_x$ and $T_d$.

Referring back to FIG. 1 110 for another aspect of the invention, the method in calculating the effective capacitance in the presence of variation effect is further discussed in FIG. 13 with cross-talk 1301 after we have obtained the admittance matrix in terms of poles and residues expressed in powers of variation parameters read from file 105. Without loss of generality, assuming there are two ports for one victim and one aggressor as shown in FIG. 14. We have 1302

$A_{11}(s)V_1(s)+A_{12}(s)V_2(s)=i_1(s)$ $A_{21}(s)V_1(s)+A_{22}(s)V_2(s)=i_2(s)$ in which $A_{11}$ is the matrix element of 2×2 admittance matrix, $V_1(s)(i_1(s))$ and $V_2(s)$ ($i_2(s)$) are voltages(currents) in s domain at victim and aggressor node. The purpose is to iteratively 1303 find the effective capacitances $C_{eff,1}$ and $C_{eff,2}$ at victim and aggressor nodes 1 and 2, respectively. Initial values for $C_{eff,1}$ and $C_{eff,2}$ are given first. Then the waveforms in terms of $t_{x,i}$ and $t_{D,i}$ at node i (i=1 and 2) are evaluated with $t_x$ and $t_D$ being defined similar to the those in the case of one port. Here all of the constants $C_{eff,i}$, $t_{x,i}$, $t_{D,i}$ (i=0,1) obviously are random variables up to 2nd order of random parameters. We have 1304

$\int_0^{t_{D1}}i_1(t)dt = \int_0^{t_{D1}}\mathcal{L}^{-1}(i_i(s))dt = Q_1$ $= Q_{11}+Q_{12}=\int_0^{t_{D1}}\mathcal{L}^{-1}(A_{11}(s)V_1(s))dt+\int_0^{t_{D1}}\mathcal{L}^{-1}(A_{12}(s)V_2(s))dt$ Note that waveforms $V_1(t)$ and $V_2(t)$ in time domain at nodes 1 and 2 have different starting points. The integration range from 0 to $t_{D1}$ are with respect to the starting point of waveform at node 1. We therefore need to transform 0 and $t_{D1}$ to the coordinate system used by $V_2(t)$. For example the waveform $V_1(t)$ starts from, say $T_1$, from origin, while waveform at node 2 starts from $T_2$ as shown in FIG. 14. Therefore, in carrying out the integral involving $V_2(t)$ 0 and $t_{D,1}$ become $T_1-T_2$ and $t_{D,1}+T_1-T_2$. As to integration, the same formula as being used in one port case 1305 is adopted. Then $C_{eff,1}$ is obtained by $Q_1$ 1306

$$C_{eff,1} = \frac{Q_1}{b_1(t_{D,1} - t_{x,1}/2)}$$

$C_{eff,2}$ is obtained similarly. Through tedious calculation all of the above constants are random variable with nominal part and variation part up to the 2nd order of random parameter, thus $C_{eff,1}$ and $C_{eff,2}$ are also calculated to the 2nd power in random parameters. The process is iterated until convergence 1307 is reached. In cases of more than one aggressors, we need to find the switching tomes for each aggressor with respect to the victim in order to obtain maximum delay from victim input to victim output. This procedure is similar to that in the case of STA and not repeated here. The discussion on victim glitch is exactly the same as that in the case of calculating maximum delay of the victim except setting voltage a constant at the input of the victim driver. Therefore, there is no further discussion on glitch in cross-talk.

Figure 15:
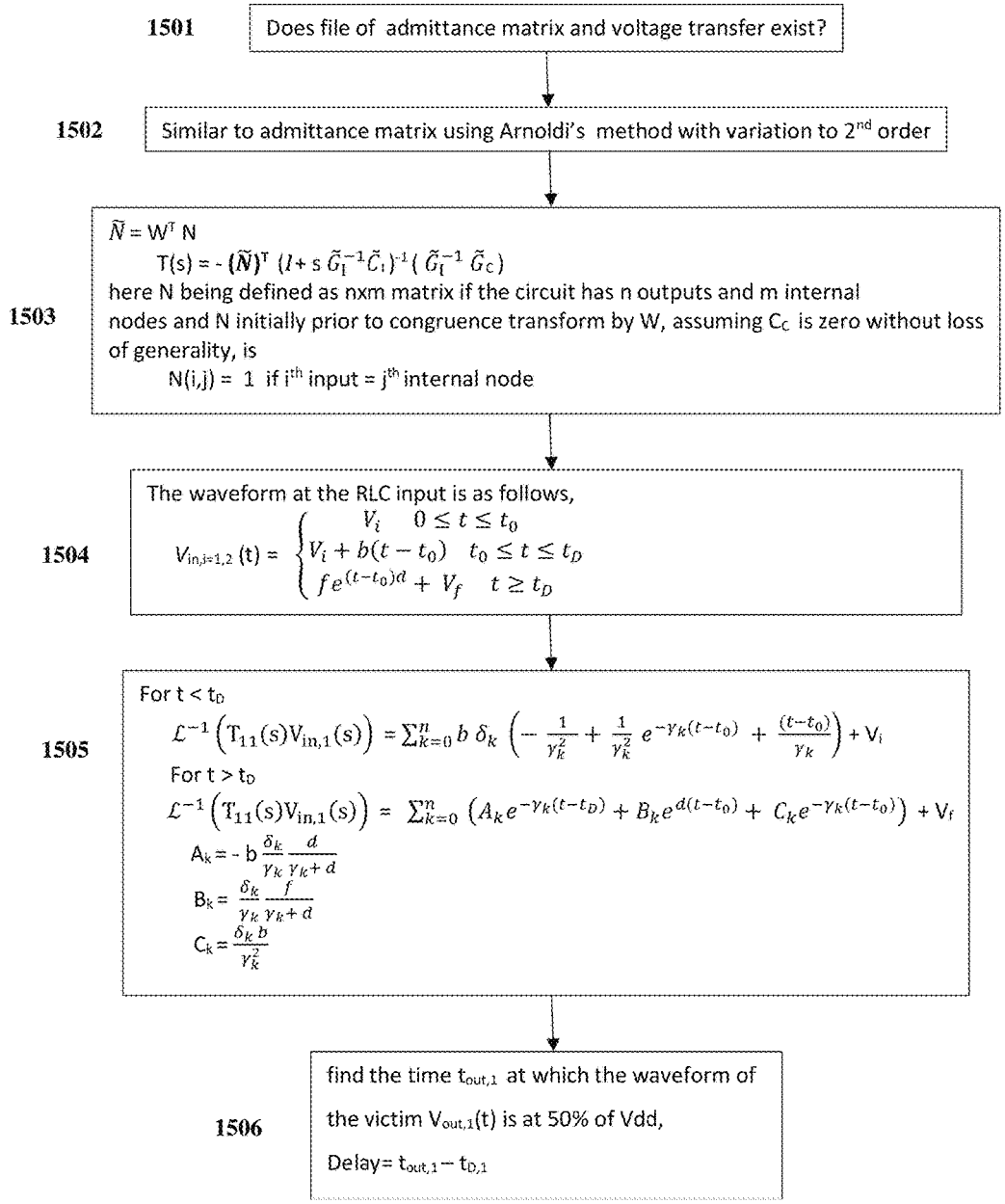
FIG. 15 is a flowchart for RLC solver of voltage transfer with variation effects to the second order.

Referring back to FIG. 1 111 for another aspect of the invention, the method for calculating delay as a random variable is addressed assuming the switching times of the aggressors are given. As shown in FIG. 15 we use voltage transfer from RLC inputs to outputs 1501 to get output waveform by utilizing the waveform at the inputs. In case there are n inputs and m outputs, we have $$V_{out}(s)=T(s)V_{in}(s)$$

in which Vout (s) is a m×1 matrix, T(s) is m×n matrix and Vin (s) is n×1 matrix with each matrix element being a random variable up to the $2^{nd}$ order of variation effects. Both admittance matrix and voltage transfer are treated under the same formulation. By using the same Arnoldi's method 1502 in obtaining $W=[W_0\ W_1\ \ldots\ W_{q-1}]$ which is an orthonormal matrix spanning the Krylov space $Kr(G_I^{-1}C_I, G_I^{-1}G_C, q)$ and making the congruence transform as in the case of calculating admittance matrix, we achieve 1503

$$\tilde{N}=W^T N$$

$$T(s)=-(\tilde{N})^T(I+s\tilde{G}_I^{-1}\tilde{C}_I)^{-1}(\tilde{G}_I^{-1}\tilde{G}_C)$$

here N being defined as n×m matrix if the circuit has n outputs and m internal nodes and N initially prior to congruence transform by W, assuming $C_C$ is zero without loss of generality, is $N_{ij}=1$ if $i^{th}$ input=$j^{th}$ internal node By comparing T(s) with Y(s)

$$Y(s)=G_P+sC_P-(\tilde{G}_C)^T(I+s\tilde{G}_I^{-1}\tilde{C}_I)^{-1}(\tilde{G}_I^{-1}\tilde{G}C)$$

as obtained before, we see that $G_P+s\ C_P$ is not contained in T(s) and $\tilde{G}_C$ in Y(s) is replaced by $\tilde{N}$ in T(s). Thus, the matrix element of T(s) does not include $\alpha+\beta s$. Similar to the handling of admittance matrix the voltage transfer can be expanded to the $2^{nd}$ order of variation terms, and then fitted into simple pole and residue including variation terms to obtain poles and residues to the second order of variations. Without loss of generality we assume $V_{out}$ (s) is a 3×1 matrix, T(s) is 3×2 matrix and $V_{in}$ (s) is 2×1 matrix, $V_{out,1}(t)$ and $V_{out,2}(t)$ refer to waveform at output nodes of victim and aggressor, respectively. For output 1, we have $$V_{out,1}(t)=\mathcal{L}^{-1}(T_{11}(s)V_{in,1}(s))+\mathcal{L}^{-1}(T_{12}(s)V_{in,2}(s))$$

$V_{in,1}$ (t) and $V_{in,2}$ (t) are defined similarly as in the discussion of effective capacitance for the case of one port with the combination of three regions including quadratic, linear and exponential forms. In the actual implementation the quadratic part can be neglected without suffering too much inaccuracy. In this approximation $V_{in,1}$ (t) stays at initial constant value $V_i$, which is either Vdd or 0 depending on fall or rise transition at RLC input, for the period of time denoted by $t_0$ before the waveform starts changing. $V_{in,1}$ (t) and $V_{in,2}$ (t) have their own $t_0$, meaning they have different switching times. Using the aforementioned formula as follows, $$V_{in,1}(t)=a+b(t-t_x)$$

The starting point $t_0$ when $V_{in,1}$ (t) changes from initial value $V_i$ is $$t_0=\frac{(V_i-a+bt_x)}{b}$$

The waveform at the RLC input is as follows 1504, $$V_{in,i=1,2}(t)=\begin{cases}V_i & 0\le t\le t_0 \\ V_i+b(t-t_0) & t_0\le t\le t_D \\ fe^{(t-t_0)d}+V_f & t\ge t_D\end{cases}$$

It is emphasized that all of t, $t_0$ and $t_D$ are measured from the origin which is the starting point when the input of the driver starts changing. We have $$\mathcal{L}^{-1}(T_{11}(s)V_{in,1}(s))=-e^{-\gamma t}\frac{\delta}{\gamma}\int_0^t e^{\gamma x}V'_{in,1}(x)\,dx+\frac{\delta}{\gamma}V_{in,1}(t)$$

The notation for summing all pairs of residue and pole is omitted. In actual calculation it is neat to change t coordinate from to and $t_D$ becomes $t_D-t_0$, and then replace t by $t-t_0$. We have 1505

For $t<t_D$ $$\mathcal{L}^{-1}(T_{11}(s)V_{in,1}(s))=\sum_{k=0}^n b\delta_k\left(-\frac{1}{\gamma_k^2}+\frac{1}{\gamma_k^2}e^{-\gamma_k(t-t_0)}+\frac{(t-t_0)}{\gamma_k}\right)+V_i$$

For $t>t_D$ $$\mathcal{L}^{-1}(T_{11}(s)V_{in,1}(s))=\sum_{k=0}^n (A_k e^{-\gamma_k(t-t_D)}+B_k e^{d(t-t_0)}+C_k e^{-\gamma_k(t-t_0)})+V_f$$

$$A_k=-b\frac{\delta_k}{\gamma_k}\frac{d}{\gamma_k+d}$$

$$B_k=\frac{\delta_k}{\gamma_k}\frac{f}{\gamma_k+d}$$

$$C_k=\frac{\delta_k b}{\gamma_k^2}$$

After the waveform at the output node of the victim is obtained, the next step is to find the time $t_{out,1}$ at which the waveform of the victim $V_{out,1}(t)$ is at 50% of Vdd, then the delay from the input of RLC input, say node 1 which is the input of the victim, to the output node can be obtained as 1506, Delay=$t_{out,1}-t_{D,1}$ Note that Delay is a random variable up to the $2^{nd}$ order variation effect. Knowing that all the constants such as $t_0$, $t_D$, f, d, b in fact are random variables expressed by random parameters up to the second order, the waveform at output node is also a random variable up to the 2nd order effect. We use an example as shown in FIG. 16 with only one random parameter a to explain this method, and the generalization to more than one random parameters is straightforward. The output waveform, say f(t,α), can be expanded in powers of α as follows 1601, $$f(t,\alpha)=f_0(t)+f_1(t)\alpha+f_2(t)\alpha^2$$

The purpose is to find the random variable t being expressed as 1602

$$t=t_n+\Delta t=t_n+x\alpha+y\alpha^2$$

$$f(t,\alpha)=0.5\ Vdd$$

The function f(t,α) is further expanded in power of Δt 1603

$$f(t, \alpha) = f_0(t_n) + f_0'(t_n)(x\alpha + y\alpha^2) +$$
$$f_0''(t_n)\frac{1}{2}x^2\alpha^2 + f_1(t_n)\alpha + f_1'(t_n)(x\alpha^2) + f_2(t_n)\alpha^2 =$$
$$f_0(t_n) + \alpha(f_0'(t_n)x + f_1(t_n)) +$$
$$\alpha^2\left(f_2(t_n) + f_0'(t_n)y + f_0''(t_n)\frac{1}{2}x^2 + f_1'(t_n)x + f_2(t_n)\right)$$

We therefore obtain $t_n$, x and y as by solving the following equations sequentially 1604

$$f_0(t_n) = 0.5 \ Vdd$$
$$x = -\frac{f_1(t_n)}{f_0'(t_n)}$$
$$y = -\frac{f_2(t_n) + f_0''(t_n)\frac{x^2}{2} + f_1'(t_n)x + f_2(t_n)}{f_0'(t_n)}$$

In conclusion, the issue of SSTA in multi-phase sequential circuit with cross-talk in consideration of process variations up to the $2^{nd}$ order is not addressed well. There are several difficulties. First, in multi-phase sequential circuit timing constraint can be non-uniform and complex. This invention provides a novel method to utilize breadth first traversal and special algorithm to store longest arrival time as random variable and accumulated probability at each node with respect to clock phases and generates edge probability matrix from input to output of the gate associated with stored input and output clock phases, then followed by backward search to get critical paths in terms of probability. Secondly, the accuracy of delay based on Gaussian distribution is questionable. This invention solves the problem by adopting Non-Gaussian behavior and provides a method to pre-characterize the timing library for the gate output delay and slope as random variables as a function input slope and output loading up to the $2^{nd}$ order of variation. Thirdly, the issue of interconnect including cross-talk needs to be handled by considering non-Gaussian behavior. This invention provides a novel way to calculate admittance matrix and voltage transfer up to $2^{nd}$ order of process variation and fitted the results into simple pole format to obtain poles and residues for each matrix element up to $2^{nd}$ order of variation. Effective capacitance and interconnect delay can be calculated up to $2^{nd}$ order of variation by using poles and residues including up to second order variation effects of both admittance matrix and voltage transfer, accordingly. The invention further provides a method for cross-talk with multiple ports to evaluate effective capacitances at the ports individually and waveforms at the ports are then used to calculate delay expressed as random variable containing $2^{nd}$ order variation terms at victim outputs. With all of these in place, SSTA is used to identify critical paths in terms of probability in an accurate manner.

It should be noted that a timing verification tool according to the invention may have one or more of the above-described capabilities in any combination, and any of these novel capabilities can be combined with conventional or other novel timing verification tools.

Accordingly, although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A computer-implemented method for performing SSTA of an integrated circuit with multi-phase sequential elements with interconnect, comprising the computer-implemented steps of:

accepting said integrated circuit connectivity into SSTA; and using path analysis including both forward bread first search and backward depth first traversal considering constraint with multi-phase sequential elements to generate critical paths in terms of probability of path occurrence considering non-Gaussian variation up to quadratic order; and identifying the said critical paths based on the user-defined threshold in terms of probability of path occurrence for more accurate design for manufacturing; and considering gate and interconnect delays with non-Gaussian variation up to quadratic order in the said path analysis; and handling cross-talk issue with non-Gaussian variation up to quadratic order in the said path analysis; and characterizing cells with non-Gaussian variation up to quadratic order.

2. A computer-implemented method according to claim 1, wherein the step of using path analysis including forward breadth first search considering constraint with multi-phase sequential elements, comprising the computer-implemented steps of:

setting accumulated probability as a vector with accum_prob(a,P1) representing its component with respect to the clock phase P1 of the circuit at the node a, and setting accum_prob(a,P1)=1 if node a is output of a flip-flop controlled by clock phase P1;

storing clock phases at each node for its driven flip-flops for the whole circuit;

selecting any two clock phases P1 and P2 from latest arrival times of input e and f for gate with output c and using the nominal times from the said latest arrival times to compare against the driven clock phases in node c to determine if these two phases have fixed ordering, and if false, storing two separate phases P1 and P2, otherwise, storing the clock phase P1 or P2 from the input which is more critical than the other input, and nominal time at node c is associated with respect to the said clock phase by calculating the maximum of the two random variables corresponding to these two latest arrival times at e and f plus the input delays from e to c and f to c, respectively, in terms of random variables;

computing edge probability matrix edge_prob from input e to c as with matrix element edge_prob(e,c,P1,P2) and edge_prob(f,c,P2,P2) representing the probability for d1>d2, d1 is the latest arrival time at e plus the delay from e to c and d2 defined similarly, and the latest arrival times are stored in nodes e, f, c with respect to clock phases P1, P2, and P2, respectively;

evaluating accum_prob(c,P2) by utilizing $$accum\_prob(c,P2)=\max(accum\_prob(e,P1)*edge\_prob(e,c,P1,P2),accum\_prob(f,P2)*edge\_prob(f,c,P2,P2)).$$

3. A computer-implemented method according to claim 1, wherein the step of using path analysis including backward depth first traversal considering timing constraint with multi-phase sequential elements, comprising the computer-implemented steps of:
identifying the data input of the flip-flops, say f, with negative slack and obtaining the probability of failure cur_prob=user specified probability-slack for the most critical path ending at the said node;
searching paths backward recursively based on depth first traversal, comprising:
starting from the said node f with probability of failure cur_prob;
obtaining clock phase Q recursively and clock phase P stored in the latest arrival times for nodes f and input node e of fanin gate of the said node f, and the following quantities, $$x=edge\_prob(e,f,Q,P)$$

$$y=accum\_prob(e,Q)$$

$$z=accum\_prob(f,P);$$

evaluating probability new_prob for the path passing through e with clock phase Q to node f with clock phase P to be $$new\_prob=cur\_prob*y*x/z;$$

comparing new_prob with user specified threshold probability, and if true, continue the process iteratively, and if not true, continue with next clock phase in node e, then continue with another input of said fanin gate of node f recursively until the process is finished.

4. A computer-implemented method according to claim 1, wherein the step of characterizing cells with non-Gaussian variation up to quadratic order, comprising the computer-implemented steps of:
pre-characterizing cell by generating the mathematical equations describing the cell delay and output slew as a function of cell input slew time and cell output loading, with loading and delays being treated as random variables;
expressing the random variable S for either the cell delay or output slew as $$R=A+Bx+x^tCx$$

where $x=(x_1,x_2,\ldots x_n)^t$ is 1×n vector representing n independent process parameters with normalized Gaussian PDF N(1,0), B is 1×n vector, and C is a n×n symmetric matrix and A is a scalar, which is the constant term;
sampling data for R by fixing $S_{in}$ and $L_{out}$ to get A, B, and C at $S_{in}$ and $L_{out}$ and vary $S_{in}$ and $L_{out}$ to obtain another set of data for A, B, and C;
fitting each component a of the said scalar A, vector B and matrix C into relation as a function of cell input slew time $S_{in}$ and cell output loading $L_{out}$ $$a(S_{in},L_{out})=\Sigma_{i=1}^5 f(i)Y(i)$$

$$Y(1)=S_{in}\ Y(2)=L_{out}*S_{in}\ Y(3)=(L_{out})^3$$

$$Y(4)=L_{out}\ Y(5)=1.$$

5. A computer-implemented method according to claim 1, wherein the step of considering gate and interconnect delays with non-Gaussian variation up to quadratic orders, comprising the computer-implemented steps of:
evaluating the driving input admittance matrix of the interconnect and voltage transfer matrix from input to output of the interconnect with the matrix element in terms of poles and residues up to quadratic order of variation effect;
computing gate effective capacitance up to quadratic order of variation effect using the input admittance matrix of the interconnect driven by the gate up to quadratic order of variation effect;
obtaining slope at the immediate output of the gate using effective capacitance and the timing library for the gate including up to quadratic order of variation effect;
calculating interconnect delay from its input to output utilizing slope at the input and voltage transfer matrix including up to quadratic order of variation effect.

6. A computer-implemented method according to claim 5, wherein the step of evaluating the driving input admittance matrix of the interconnect and voltage transfer matrix, comprising the computer-implemented steps of:
Formulating the driving input admittance matrix of the interconnect to quadratic order of variation effect by separating the ports from the remaining nodes in the circuit to obtain admittance and voltage transfer in frequency domain as follows, $$Y(s)x_p(s)=b_p(S)$$

$$Y(s)=G_P+sC_P-(G_C+sC_C)^T(G_I+sC_I)^{-1}(G_C+sC_C)$$

assuming there are m ports and n internal nodes in RLC circuit, here $x_p$ are the m port node voltages and $x_i$ include n internal node voltages and l inductor currents, $G_P$ is m×m matrix for m ports, so is $C_P$, $G_I$ and $C_I$ are (l+n)×(l+n) matrices representing n internal nodes and l inductors, both $G_C$ and $C_C$ are (l+n)×m connection conductance and susceptance matrices, respectively, and the right hand side is a (m+l+n)×m matrix with bp as being the external current at the m port nodes;
expressing resistance and capacitance as two Gaussian random variables;
evaluating $G_I$, and similarly to $G_P$, $C_P$, $G_C$, $C_C$, $C_I$ to obtain $$G_I=G_{I,0}+V$$

$$V=\Sigma_{i=1}^N G_{Ii} v_i$$

here $v_i$ stands for ith random variable up to the second order;
simplifying the calculation by zeroing Cc utilizing congruence transform $X^TGX$ and $X^TCX$ where $$X = \begin{bmatrix} I & 0 \\ -C_I^{-1}C_C & I \end{bmatrix}$$

$$X = X_0 + V$$

$$V = \sum_{i=1}^N X_i y_i$$

carrying out Arnoldi's procedure in finding the orthonormal bases $W=[W_0,W_1,\ldots W_{q-1}]$ for the Krylov space Kr($G_I^{-1} C_I$, $G_I^{-1} G_C$, q) for matching q moments of the multiport admittance with $$W_i = W_{i0} + V$$

$$V = \sum_{m=1}^{N} W_{im} v_m$$

here $W_{i0}$ is the nominal part of ith vector $W_i$, and $W_{im}$ is the coefficient of the mth random parameter $v_m$ which can second order of random variable;

rewriting admittance matrix Y(s) after congruence transform by W $$\tilde{G}_I = W^T G_I W$$

$$\tilde{C}_I = W^T C_I W$$

$$\tilde{G}_C = W^T G$$

$$Y(s) = G_P + s C_P - (\tilde{G}_C)^T (I + s \tilde{G}_I^{-1} \tilde{C}_I)^{-1} (\tilde{G}_I^{-1} \tilde{G}_C)$$

$$A = \tilde{G}_I^{-1} \tilde{C}_I = A_0 + V$$

$$V = \sum_{i=1}^{N} V_i y_i$$

$$B = \tilde{G}_I^{-1} \tilde{G}_C = B_0 + Y$$

$$Y = \sum_{i=1}^{N} Y_i y_i$$

$$C = (\tilde{G}_C)^T = C_O + Z$$

$$Z = \sum_{i=1}^{N} Z_i y_i;$$

expanding Y(s) to the $2^{nd}$ order of V $$Y(s) = G_P + sC_P - (C_0 + Z)(I + s(A_0 + V))^{-1}(B_0 + Y) = G_P + sC_P - $$
$$C_0(I + sA_0)^{-1} B_0 + C_0(I + sA_0)^{-1} Y + Z(I + sA_0)^{-1} sV(I + sA_0)^{-1} B_0 + $$
$$C_0(I + sA_0)^{-1} sV(I + sA_0)^{-1} Y + C_0(I + sA_0)^{-1} sV(I + sA_0)^{-1} B_0 + $$
$$C_0(I + sA_0)^{-1} sV(I + sA_0)^{-1} sV(I + sA_0)^{-1} B_0;$$

fitting coefficients of simple and double poles for each random variable to the second order into $$\frac{\beta + xc + x^2 d}{s + \alpha + xa + x^2 b} = \frac{\beta}{s + \alpha} + x\left[\frac{-a\beta}{(s+\alpha)^2} + \frac{c}{s+\alpha}\right] + x^2\left[\frac{-\beta b}{(s+\alpha)^2} - \frac{ac}{(s+\alpha)^2} + \frac{d}{(s+\alpha)} + \frac{a^2 \beta}{(s+\alpha)^3}\right]$$

to obtain a, b, c and d representing the second order variation effects for poles and residues.

7. A computer-implemented method according to claim 5, wherein the step of computing gate effective capacitance up to quadratic order of variation effect using the input admittance matrix of the interconnect driven by the gate up to quadratic order of variation effect, comprising the computer-implemented steps of:

adopting iterative procedure, choosing initial capacitance with variation up to the $2^{nd}$ order of random variables; and evaluating waveform parameters with $2^{nd}$ order variation effects by using pre-characterized timing library; and re-evaluating capacitance utilizing driving input admittance matrix in terms of poles and residues with $2^{nd}$ order variation effects; and iterating the steps until the nominal part of the effective capacitance reaches convergence.

8. A computer-implemented method according to claim 7, wherein the step of adopting iterative procedure, comprising the computer-implemented steps of:

approximating the waveform at the input of the interconnect by $$V(t) = \begin{cases} V_i - ct^2 & 0 \leq t \leq t_x \\ a + b(t - t_x) & t_x \leq t \leq t_D \\ f e^{td} + V_f & t \geq t_D \end{cases}$$

where the origin of time is chosen to be the point where the input of the driver starts making transition, $V_i$ is the initial value Vdd (0) when V(t) is in fall(rise) transition, and $V_f$ is the final node value Vdd (0) when V(t) is in rise(fall) transition, and $t_x$ is defined to be the time when the voltage falls(rises) to 80% (20%) of Vdd;

expressing admittance matrix, current and voltage at the said input of the interconnect in s domain as $$i(s) = Y(s) V(s) + V_{init} = \left(\alpha s + \beta + \sum_{k=1}^{n} \frac{\delta_k}{s + \gamma_k}\right) V(s) - \alpha V_i + V_i \sum_{k=1}^{n} \frac{\delta_k / \gamma_k}{s + \gamma_k};$$

evaluating updated $C_{eff}$ by $$C_{eff} b\left(t_D - \frac{t_x}{2}\right) = \frac{2c\delta}{\gamma^4}(e^{-\gamma(t_D - t_x)} - e^{-\gamma t_D}) - \frac{2c\delta t_x}{\gamma^3} + \left(t_D - \frac{t_x}{2}\right) b\left(\alpha - \frac{\delta}{\gamma^2}\right)$$

re-computing the waveform at the input of interconnect to obtain the updated coefficients a, b, and c in terms of random variables up to the $2^{nd}$ order of variation effects;

iterating the process until convergence is reached.

9. A computer-implemented method according to claim 7, wherein the step of handling cross-talk issue with non-Gaussian variation up to quadratic order in the path analysis, comprising the computer-implemented steps of:

expressing port current in terms of admittance matrix with one victim $V_1(s)$ and one aggressor $V_2(s)$ without loss of generality $$A_{11}(s) V_1(s) + A_{12}(s) V_2(s) = i_1(s)$$

$$A_{21}(s) V_1(s) + A_{22}(s) V_2(s) = i_2(s)$$

in which $A_{11}$ is the matrix element of 2×2 admittance matrix with poles and residues including up to $2^{nd}$ order variation effects, V1(s)($i_1$(s)) and $V_2$(s) ($i_2$(s)) are voltages(currents) in s domain at victim and aggressor node;

using iteration method to find the effective capacitances $C_{eff,1}$ and $C_{eff,2}$ at victim and aggressor nodes 1 and 2) up to the $2^{nd}$ order of variation effect, respectively;

obtaining waveforms at the said nodes 1 and 2 in terms of random variables tx,i and tD,i at node i (i=1 and 2) up to the $2^{nd}$ order of variation effect similar to the case with one port;

evaluating total charge $Q_1$ treated as a random variable up to the $2^{nd}$ order of variation effect flowing into the said node 1 till $t_{D,1}$ $$\int_0^{t_{D1}} i_1(t)\,dt = \int_0^{t_{D1}} \mathcal{L}^{-1}(i_1(s))\,dt =$$

$$Q_1 = Q_{11} + Q_{12} = \int_0^{t_{D1}} \mathcal{L}^{-1}(A_{11}(s)V_1(s))\,dt + \int_0^{t_{D1}} \mathcal{L}^{-1}(A_{12}(s)V_2(s))\,dt$$

carrying out the integral involving $V_2(t)$ with integration limits 0 and $t_{D,1}$ becoming $T_1-T_2$ and $t_{D,1}+T_1-T_2$ assuming $V_1(t)$ starts from $T_1$ and $V_2(t)$ starts from $T_2$;
obtaining random variable $C_{eff,1}$ to the $2^{nd}$ order of variation effect by applying $$C_{eff,1} = \frac{Q_1}{b_1(t_{D,1} - t_{x,1}/2)}$$

and $C_{eff,2}$ similarly;
re-computing waveforms at said nodes 1 and 2 using updated $C_{eff,1}$ and $C_{eff,2}$ until convergence is reached.

10. A computer-implemented method according to claim 7, wherein the step of handling cross-talk issue with non-Gaussian variation up to quadratic order in the path analysis, further comprising the computer-implemented steps of:

using voltage transfer from interconnect n inputs to m outputs to get output waveform and delays from interconnect inputs to outputs by utilizing the waveform at the inputs;
expressing voltage transfer $V_{out}$ (s) as $$V_{out}(s) = T(s)V_{in}(s)$$

in which Vout (s) is a m×1 matrix, T(s) is m×n matrix and Vin (s) is n×1 matrix with each matrix element being a random variable up to the $2^{nd}$ order of variation effects;
utilizing the same Arnoldi's method as used in admittance matrix calculation to obtain $W=[W_0\ W_1\ \ldots\ W_{q-1}]$ which is an orthonormal matrix spanning the Krylov space $Kr(G_I^{-1}C_I, G_I^{-1}G_C, q)$;
making the congruence transform as in the case of calculating admittance matrix, to achieve $$\tilde{N} = W_T N$$

$$T(s) = -(\tilde{N})^T(I + s\tilde{G}_I^{-1}\tilde{C}_I)^{-1}(\tilde{G}_I^{-1}\tilde{G}_C)$$

here N being defined as n×m matrix if the circuit has n outputs and m internal nodes and N initially prior to congruence transform by W, assuming $C_C$ is zero without loss of generality, is $N(i,j)=1$ if $i^{th}$ input=$j^{th}$ internal node;

fitting matrix element of T(s) up to the $2^{nd}$ order of random variable to the format of simple pole and residue including $2^{nd}$ order variation terms.

11. A computer-implemented method according to claim 10, wherein the step of using voltage transfer from interconnect n inputs to m outputs to get output waveform and delays from interconnect inputs to outputs by utilizing the waveform at the inputs, Comprising the computer-implemented steps of:
expressing $V_{out,1}(t)$, without loss of generality, as $$V_{out,1}(t) = \mathcal{L}^{-1}(T_{11}(s)V_{in,1}(s)) + \mathcal{L}^{-1}(T_{12}(s)V_{in,2}(s))$$

by assuming that $V_{out}$ (s) is a 3×1 matrix, T(s) is 3×2 matrix and $V_{in}$ (s) is 2×1 matrix, and $V_{out,1}(t)$ and $V_{out,2}(t)$ refer to waveform at output nodes of victim and aggressor, respectively;
approximating input waveforms by $$V_{in,i=1,2}(t) = \begin{cases} V_i & 0 \leq t \leq t_0 \\ V_i + b(t-t_0) & t_0 \leq t \leq t_D \\ fe^{(t-t_0)d} + V_f & t \geq t_D \end{cases}$$

where $t_D$ is defined such that $V_{in,i=1,2}(t_D) = 0.5$ Vdd or any specified value;
calculating $V_{out,1}(t)$ as follows, $$\mathcal{L}^{-1}(T_{11}(s)V_{in,1}(s)) = -e^{-\gamma t}\frac{\delta}{\gamma}\int_0^t e^{\gamma x}V'_{in,1}(x)\,dx + \frac{\delta}{\gamma}V_{in,1}(t)$$

For $t < t_D$ $$\mathcal{L}^{-1}(T_{11}(s)V_{in,1}(s)) = \sum_{k=0}^n b\delta_k\left(-\frac{1}{\gamma_k^2} + \frac{1}{\gamma_k^2}e^{-\gamma_k(t-t_0)} + \frac{(t-t_0)}{\gamma_k}\right) + V_i$$

For $t > t_D$ $$\mathcal{L}^{-1}(T_{11}(s)V_{in,1}(s)) = \sum_{k=0}^n (A_k e^{-\gamma_k(t-t_D)} + B_k e^{d(t-t_0)} + C_k e^{-\gamma_k(t-t_0)}) + V_f$$

$$A_k = -b\frac{\delta_k}{\gamma_k}\frac{d}{\gamma_k + d}$$

$$B_k = \frac{\delta_k}{\gamma_k}\frac{f}{\gamma_k + d}$$

$$C_k = \frac{\delta_k b}{\gamma_k^2}$$

finding the time $t_{out,1}$ at which the waveform of the victim $V_{out,1}(t)$ is at 50% of Vdd, to obtain the delay from the input of interconnect, say node 1 which is the input of the victim, to the output node as Delay=$t_{out,1} - t_{D,1}$.

12. A computer-implemented method according to claim 10, wherein the step of finding the time $t_{out,1}$ at which the waveform of the victim $V_{out,1}(t)$ is at 50% of Vdd, comprising the computer-implemented steps of:
expressing the output waveform, say $f(t,\alpha)$ as follows, $$f(t,\alpha) = f_0(t) + f_1(t)\alpha + f_2(t)\alpha^2$$

by assuming there is only one random variable a without loss of generality;
finding random variable t being expressed as $$t = t_n + \Delta t = t_n + x\alpha + y\alpha^2$$

$$f(t,\alpha) = 0.5\ \text{Vdd};$$

solving these equations to obtain $$f_0(t_n) = 0.5\ Vdd$$

$$x = -\frac{f_1(t_n)}{f'_0(t_n)}$$

$$y = -\frac{f_2(t_n) + f''_0(t_n)\frac{x^2}{2} + f'_1(t_n)x + f_2(t_n)}{f'_0(t_n)}.$$

13. A non-transitory computer-readable medium having instructions stored therein which, when executed by a computer, cause the computer to perform the method of claim 1.

* * * * *